(12) United States Patent
Wenzel

(10) Patent No.: US 11,379,935 B2
(45) Date of Patent: Jul. 5, 2022

(54) CENTRAL PLANT CONTROL SYSTEM WITH EQUIPMENT MAINTENANCE EVALUATION

(71) Applicant: Johnson Controls Technology Company, Auburn Hills, MI (US)

(72) Inventor: Michael J. Wenzel, Grafton, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 307 days.

(21) Appl. No.: 16/112,582

(22) Filed: Aug. 24, 2018

(65) Prior Publication Data

US 2019/0066236 A1 Feb. 28, 2019

Related U.S. Application Data

(60) Provisional application No. 62/550,437, filed on Aug. 25, 2017.

(51) Int. Cl.
*G06Q 50/06* (2012.01)
*F01K 13/02* (2006.01)
(Continued)

(52) U.S. Cl.
CPC ............ *G06Q 50/06* (2013.01); *F01K 13/00* (2013.01); *F01K 13/02* (2013.01); *G05B 13/042* (2013.01);
(Continued)

(58) Field of Classification Search
CPC .... G06Q 50/06; G06Q 10/20; G06Q 30/0283; G06Q 10/06; G06Q 10/04; F01K 13/00; F01K 13/02; G05B 13/042
(Continued)

(56) References Cited

U.S. PATENT DOCUMENTS

| 8,903,554 B2 | 12/2014 | Stagner | |
| 2002/0120412 A1* | 8/2002 | Hayashi | ................... H02J 3/00 702/61 |

(Continued)

FOREIGN PATENT DOCUMENTS

| EP | 2 657 468 A2 | 10/2013 |
| EP | 2 940 259 A1 | 11/2015 |

(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

(Continued)

*Primary Examiner* — Rocio Del Mar Perez-Velez
*Assistant Examiner* — Alicia M. Choi
(74) *Attorney, Agent, or Firm* — Foley & Lardner LLP

(57) ABSTRACT

A control system for cost optimal operation of an energy facility including equipment covered by a maintenance contract includes equipment configured to operate during an optimization period and a controller. The controller modifies a cost function to include a maintenance cost term that defines a maintenance cost as a function of a rate variable and an equipment usage variable. The controller simulates a cost of operating the energy facility over the optimization period at each of a plurality of different values of the rate variable, selects a value of the rate variable that results in a lowest cost of operating the energy facility over the optimization period, performs an online optimization of the cost function with the rate variable set to the selected value to generate one or more setpoints for the equipment, and operates the equipment during the optimization period in accordance with the generated setpoints.

20 Claims, 15 Drawing Sheets

(51) Int. Cl.
  *F01K 13/00* (2006.01)
  *G05B 13/04* (2006.01)
  *G06Q 10/00* (2012.01)
  *G06Q 30/02* (2012.01)

(52) U.S. Cl.
  CPC ......... *G06Q 10/20* (2013.01); *G06Q 30/0283* (2013.01)

(58) Field of Classification Search
  USPC ....................................................... 700/287
  See application file for complete search history.

(56) References Cited

U.S. PATENT DOCUMENTS

| | | | |
|---|---|---|---|
| 2004/0102924 | A1 | 5/2004 | Jarrell et al. |
| 2008/0082345 | A1* | 4/2008 | Greiner .................. G06Q 10/06 705/305 |
| 2009/0292574 | A1* | 11/2009 | Pop ....................... F22B 37/002 705/7.37 |
| 2017/0288401 | A1* | 10/2017 | Hummon ............... G05B 15/02 |
| 2017/0364043 | A1* | 12/2017 | Ganti .................... G05B 13/048 |
| 2018/0284707 | A1* | 10/2018 | Menon ................. G05B 19/042 |

FOREIGN PATENT DOCUMENTS

| | | |
|---|---|---|
| WO | WO-2007/149190 A2 | 12/2007 |
| WO | WO-2011/106712 A2 | 9/2011 |
| WO | WO-2015/031581 A1 | 3/2015 |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsei, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Uppr Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

Extended European Search Report for European Application No. 18190831.0, dated Jan. 24, 2019, 6 pages.

* cited by examiner

CENTRAL PLANT CONTROL SYSTEM WITH EQUIPMENT MAINTENANCE EVALUATION

CROSS-REFERENCE TO RELATED PATENT APPLICATION

This application claims the benefit of and priority to U.S. Provisional Patent Application No. 62/550,437 filed Aug. 25, 2017, the entire disclosure of which is incorporated by reference herein.

BACKGROUND

The present disclosure relates generally to an energy cost optimization system for a building, a collection of buildings, or a central plant. The present disclosure relates more particularly to an energy cost optimization system that incorporates maintenance contracts into an economic optimization for various assets in the building, collection of buildings, or the central plant, as well as energy load setpoints for the assets.

Assets in a building or central plant can include individual pieces of equipment or groups of equipment. For example, assets can include boilers, chillers, heat recovery chillers, steam generators, electrical generators, thermal energy storage tanks, batteries, air handling units, or other types of equipment in a building or a central plant. Assets can include collections of equipment which form a subplant of a central plant. For example, assets can include a heater subplant, a chiller subplant, a heat recovery chiller subplant, a steam subplant, and/or an electricity subplant. Some buildings or central plants include assets such as thermal energy storage (e.g., one or more cold thermal energy storage tanks) or electrical energy storage (e.g., one or more batteries).

In some scenarios, an owner of an asset might contract with a maintenance provider to perform maintenance under a fixed contract. In this case, the contract terms may specify a base cost $c_{base}$ which covers base number of run hours $t_{base}$ and a marginal cost $c_m$ for each hour that the asset is operated exceeding the base number of run hours $t_{base}$. For example, the contract might stipulate $500,000 dollars for the first 4,000 run hours and an additional $42 per hour exceeding 4,000 hours. The maintenance cost can be expressed as a piecewise-defined function, as shown in the following equation:

$$\text{AnnualCost} = \begin{cases} c_{base} & t < t_{base} \\ c_{base} + c_m(t - t_{base}) & t \geq t_{base} \end{cases}$$

where AnnualCost is the total maintenance cost per year, $c_{base}$ is the base cost, $t_{base}$ is the base number of hours covered by the base cost $c_{base}$, $c_m$ is the marginal cost for each run hour exceeding the base number of run hours $t_{base}$, and t is the number of run hours of the asset. It can be difficult to incorporate this type of maintenance contract an economic optimization for the asset.

SUMMARY

One implementation of the present disclosure is a control system for cost optimal operation of an energy facility including equipment covered by a maintenance contract. The control system includes equipment configured to operate during an optimization period and a controller. The controller is configured to obtain a cost function that defines a cost of operating the energy facility over the optimization period as a function of one or more setpoints for the equipment, modify the cost function to include a maintenance cost term that defines a maintenance cost as a function of a rate variable and an equipment usage variable, simulate the cost of operating the energy facility over the optimization period at each of a plurality of different values of the rate variable, select a value of the rate variable that results in a lowest cost of operating the energy facility over the optimization period, perform an online optimization of the cost function with the rate variable set to the selected value to generate the one or more setpoints for the equipment, and operate the equipment during the optimization period in accordance with the one or more setpoints generated by performing the online optimization.

In some embodiments, the equipment usage variable quantifies a total number of run hours during which the equipment are operated over the optimization period and the rate variable defines an hourly cost of maintenance per run hour of the equipment.

In some embodiments, the equipment usage variable quantifies a total production of the equipment over the optimization period and the rate variable defines a cost of maintenance per unit of production of the equipment.

In some embodiments, the maintenance contract defines the maintenance cost as a piecewise-defined function of the equipment usage variable. The maintenance cost may be equal to a base cost if the equipment are operated such that the equipment usage variable is less than a base value. The maintenance cost may be equal to the base cost plus a penalty cost if the equipment are operated such that the equipment usage variable is greater than or equal to the base value, the penalty cost comprising a product of a marginal cost and an amount by which the equipment usage variable exceeds the base value.

In some embodiments, the controller is configured to determine, for each of the plurality of different values of the rate variable, a corresponding value of the equipment usage variable that results from simulating the cost of operating the energy facility over the optimization period at the corresponding value of the rate variable. The controller may be configured to identify the value of the rate variable that results in the corresponding equipment usage variable having a value substantially equal to a base value of the equipment usage variable defined by the maintenance contract and select the identified value of the rate variable as the value of the rate variable that results in the lowest cost of operating the energy facility over the optimization period.

In some embodiments, the controller is configured to simulate the cost of operating the energy facility over the optimization period with the rate variable set to zero to determine a corresponding value of the equipment usage variable, determine whether the corresponding value of the equipment usage variable is less than a base value of the equipment usage variable defined by the maintenance contract, and perform the online optimization with the rate variable set to zero in response to a determination that the corresponding value of the equipment usage variable is less than the base value of the equipment usage variable defined by the maintenance contract.

In some embodiments, the controller is configured to simulate the cost of operating the energy facility over the optimization period with the rate variable set to a marginal cost defined by the maintenance contract to determine a corresponding value of the equipment usage variable, determine whether the corresponding value of the equipment usage variable is greater than a base value of the equipment usage variable defined by the maintenance contract, and perform the online optimization with the rate variable set to the marginal cost in response to a determination that the corresponding value of the equipment usage variable is greater than the base value of the equipment usage variable defined by the maintenance contract.

In some embodiments, the controller is configured to simulate the cost of operating the energy facility over the optimization period at each of the plurality of different values of the rate variable by setting the rate variable to each of the plurality of different values and performing a plurality of offline optimizations of the cost function. Each offline optimization may use a different version of the cost function in which the rate variable is set to one of the plurality of different values.

In some embodiments, the controller is configured to identify an expected operation of the equipment during a time step of the optimization period based on the one or more setpoints generated by the online optimization, compare the expected operation of the equipment during the time step with an actual operation of the equipment during the time step, and update the value of the rate variable in response to the actual operation of the equipment during the time step differing from the expected operation of the equipment during the time step.

In some embodiments, the controller is configured to update the value of the rate variable at a time during the optimization period by identifying a base value of the equipment usage variable defined by the maintenance contract and calculating a difference between the base value of the equipment usage variable and an amount of the equipment usage variable used between a beginning of the optimization period and the time during the optimization period. The controller may determine, for each of a plurality of different values of the rate variable, a corresponding value of the equipment usage variable that results from simulating the cost of operating the energy facility over an amount of time remaining in the optimization period at the corresponding value of the rate variable. The controller may select the value of the rate variable that results in the corresponding value of the equipment usage variable having a value substantially equal to the difference between the base value of the equipment usage variable and the amount of the equipment usage variable used between the beginning of the optimization period and the time during the optimization period.

Another implementation of the present disclosure is a method for cost optimal operation of an energy facility including equipment covered by a maintenance contract. The method includes obtaining a cost function that defines a cost of operating the energy facility over the optimization period as a function of one or more setpoints for the equipment, modifying the cost function to include a maintenance cost term that defines a maintenance cost as a function of a rate variable and an energy usage variable, simulating the cost of operating the energy facility over the optimization period at each of a plurality of different values of the rate variable, selecting a value of the rate variable that results in a lowest cost of operating the energy facility over the optimization period, performing an online optimization of the cost function with the rate variable set to the selected value to generate the one or more setpoints for the equipment, and operating the equipment during the optimization period in accordance with the one or more setpoints generated by performing the online optimization.

In some embodiments, the equipment usage variable quantifies a total number of run hours during which the equipment are operated over the optimization period and the rate variable defines an hourly cost of maintenance per run hour of the equipment.

In some embodiments, the equipment usage variable quantifies a total production of the equipment over the optimization period and the rate variable defines a cost of maintenance per unit of production of the equipment.

In some embodiments, the maintenance contract defines the maintenance cost as a piecewise-defined function of the equipment usage variable. The maintenance cost may be equal to a base cost if the equipment are operated such that the equipment usage variable is less than a base value. The maintenance cost may be equal to the base cost plus a penalty cost if the equipment are operated such that the equipment usage variable is greater than or equal to the base value, the penalty cost comprising a product of a marginal cost and an amount by which the equipment usage variable exceeds the base value.

In some embodiments, the method includes determining, for each of the plurality of different values of the rate variable, a corresponding value of the equipment usage variable that results from simulating the cost of operating the energy facility over the optimization period at the corresponding value of the rate variable. The method may include identifying the value of the rate variable that results in the corresponding equipment usage variable having a value substantially equal to a base value of the equipment usage variable defined by the maintenance contract and selecting the identified value of the rate variable as the value of the rate variable that results in the lowest cost of operating the energy facility over the optimization period.

In some embodiments, the method includes simulating the cost of operating the energy facility over the optimization period with the rate variable set to zero to determine a corresponding value of the equipment usage variable, determining whether the corresponding value of the equipment usage variable is less than a base value of the equipment usage variable defined by the maintenance contract, and performing the online optimization with the rate variable set to zero in response to a determination that the corresponding value of the equipment usage variable is less than the base value of the equipment usage variable defined by the maintenance contract.

In some embodiments, the method includes simulating the cost of operating the energy facility over the optimization period with the rate variable set to a marginal cost defined by the maintenance contract to determine a corresponding value of the equipment usage variable, determining whether the corresponding value of the equipment usage variable is greater than a base value of the equipment usage variable defined by the maintenance contract, and performing the online optimization with the rate variable set to the marginal cost in response to a determination that the corresponding value of the equipment usage variable is greater than the base value of the equipment usage variable defined by the maintenance contract.

In some embodiments, simulating the cost of operating the energy facility over the optimization period at each of the plurality of different values of the rate variable includes setting the rate variable to each of the plurality of different values and performing a plurality of offline optimizations of the cost function. Each offline optimization may use a different version of the cost function in which the rate variable is set to one of the plurality of different values.

In some embodiments, the method includes identifying an expected operation of the equipment during a time step of the optimization period based on the one or more setpoints generated by the online optimization, comparing the expected operation of the equipment during the time step with an actual operation of the equipment during the time step, and updating the value of the rate variable in response to the actual operation of the equipment during the time step differing from the expected operation of the equipment during the time step.

In some embodiments, the method includes updating the value of the rate variable at a time during the optimization period by identifying a base value of the equipment usage variable defined by the maintenance contract and calculating a difference between the base value of the equipment usage variable and an amount of the equipment usage variable used between a beginning of the optimization period and the time during the optimization period. The method may include determining, for each of a plurality of different values of the rate variable, a corresponding value of the equipment usage variable that results from simulating the cost of operating the energy facility over an amount of time remaining in the optimization period at the corresponding value of the rate variable. The method may include selecting the value of the rate variable that results in the corresponding value of the equipment usage variable having a value substantially equal to the difference between the base value of the equipment usage variable and the amount of the equipment usage variable used between the beginning of the optimization period and the time during the optimization period.

DETAILED DESCRIPTION

Overview

Figure 1:
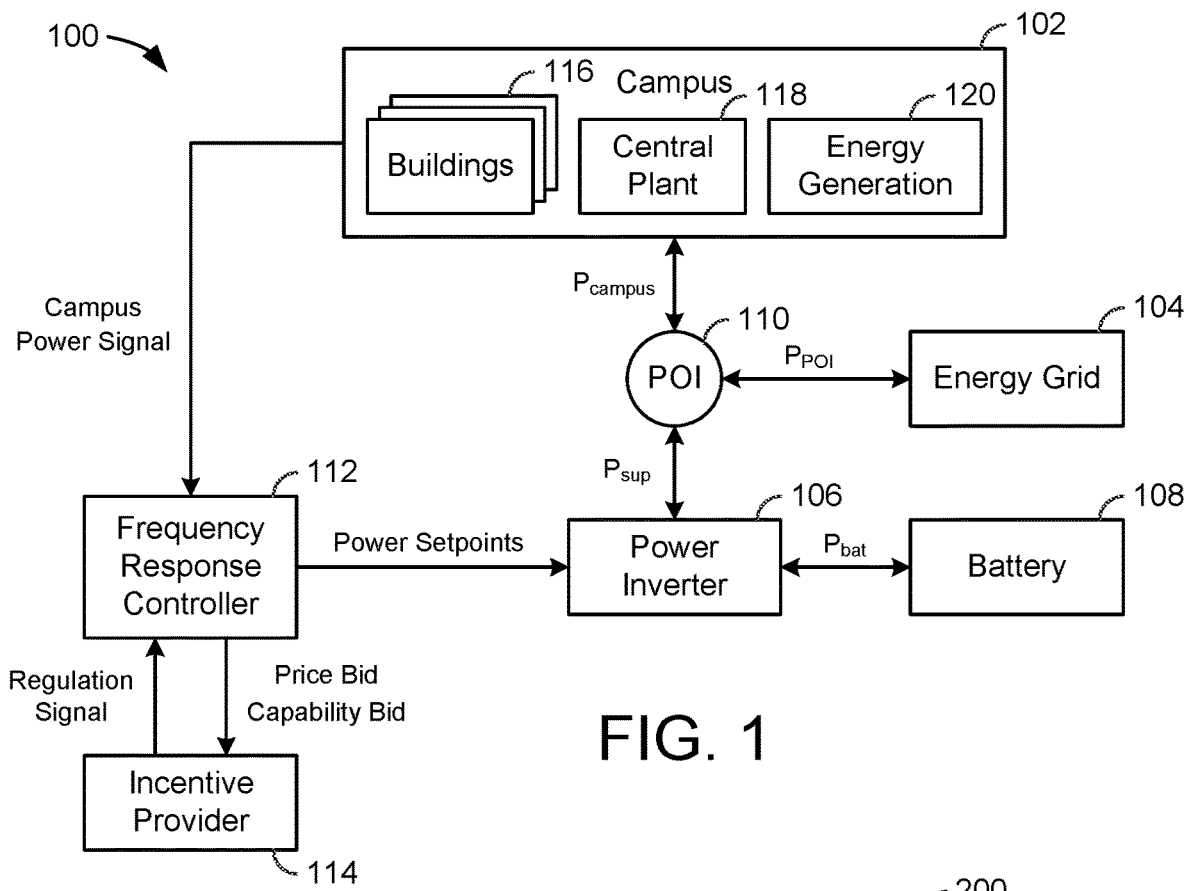
FIG. 1 is a block diagram of a frequency response optimization system, according to an exemplary embodiment.

Referring generally to the FIGURES, a building energy cost optimization system with maintenance contract incorporation and components thereof are shown according to various exemplary embodiments. The systems and methods described herein can be configured to incorporate maintenance contracts into an economic cost function J(x) used to optimize the utilization of various assets in a building, group of buildings, or a central plant. Assets can include individual pieces of equipment (e.g., boilers, chillers, heat recovery chillers, steam generators, electrical generators, thermal energy storage tanks, batteries, etc.), groups of equipment, or entire subplants of a central plant.

A maintenance contracts module can be configured to modify the cost function J(x) to include a maintenance cost term. The maintenance cost term may account for an economic or monetary cost (e.g., dollars) of performing maintenance on the assets. An example of a modified cost function $J_a(x)$ which can be generated by the maintenance contracts module is shown in the following equation:

$$J_a(x) = J(x) + \sum_{k \in horizon} c_{hourly} b_k$$

where J(x) is the original cost function, $c_{hourly}$ is the hourly cost of maintenance, and $b_k$ is a binary variable representing the on/off state of the asset at hour k of the optimization period. For example, $b_k$ may have a value of $b_k=1$ if the asset is on during hour k or a value of $b_k=0$ if the asset is off during hour k. The value of $c_{hourly}$ may be determined by the maintenance contracts module, as described in detail below.

Many assets have a fixed maintenance schedule that is dependent on the number of run hours since the last time the maintenance was performed. For example, the maintenance schedule for a chiller may involve cleaning the chiller tubes every X run hours (e.g., every 5000 run hours). A fixed cost $C may be incurred each time the maintenance is performed. For fixed maintenance schedules, the maintenance contracts module can determine the hourly cost $c_{hourly}$ by taking the maintenance cost $C and dividing by the number of run hours X between performances of the maintenance (e.g., $c_{hourly}$=$C/X). The maintenance contracts module can then incorporate the hourly cost of maintenance $c_{hourly}$ into the cost function $J_a(x)$ as a fixed cost per run hour of the asset.

In some scenarios, an owner of an asset might contract with a maintenance provider to perform maintenance under a fixed contract. In this case, the contract terms may specify a base cost $c_{base}$ which covers base number of run hours $t_{base}$ and a marginal cost $c_m$ for each hour that the asset is operated exceeding the base number of run hours $t_{base}$. For example, the contract might stipulate $500,000 dollars for the first 4,000 run hours and an additional $42 per hour exceeding 4,000 hours. The maintenance cost can be expressed as a piecewise-defined function, as shown in the following equation:

$$\text{AnnualCost} = \begin{cases} c_{base} & t < t_{base} \\ c_{base} + c_m(t - t_{base}) & t \geq t_{base} \end{cases}$$

where AnnualCost is the total maintenance cost per year, $c_{base}$ is the base cost, $t_{base}$ is the base number of hours covered by the base cost $c_{base}$, $c_m$ is the marginal cost for each run hour exceeding the base number of run hours $t_{base}$, and t is the number of run hours of the asset. Incorporating this type of maintenance contract into the optimization algorithm can be significantly more complicated than incorporating a fixed cost per run hour.

The maintenance contracts module can be configured to determine the value of $c_{hourly}$ that will yield the optimal solution to the high level optimization problem. The value of $c_{hourly}$ may reflect the true hourly cost of maintenance when the cost changes from an already sunk cost with no marginal cost to a marginal cost of $c_m$ after the equipment has be used for a stipulated number of run hours. The maintenance contracts module can use the value of $c_{hourly}$ to define the maintenance cost term in the modified cost function $J_a(x)$.

In some embodiments, the maintenance contracts module is configured to run in an offline mode (e.g., a planning mode) and an online mode (e.g., an operational mode). In the offline mode, the maintenance contracts module can perform several simulations of the year with assumed loads and utility costs (i.e., a planning run) with different values of $c_{hourly}$ in the cost function $J_a(x)$ to determine the value of $c_{hourly}$ that yields the optimal results under the terms of the maintenance contract. In the online mode, the maintenance contracts module can run the plan at different hourly costs $c_{hourly}$ to determine how to adjust the hourly cost $c_{hourly}$ at periodic times during the course of the year. This allows the maintenance contracts module to incorporate feedback as to how many of the base hours $t_{base}$ have actually been used as opposed to how many were expected to be used. The maintenance contracts module can update the hourly cost $c_{hourly}$ throughout the year based on the actual number of run hours of the assets covered by the maintenance contracts. These and other features of the maintenance contracts module are described in greater detail below.

Frequency Response Optimization

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
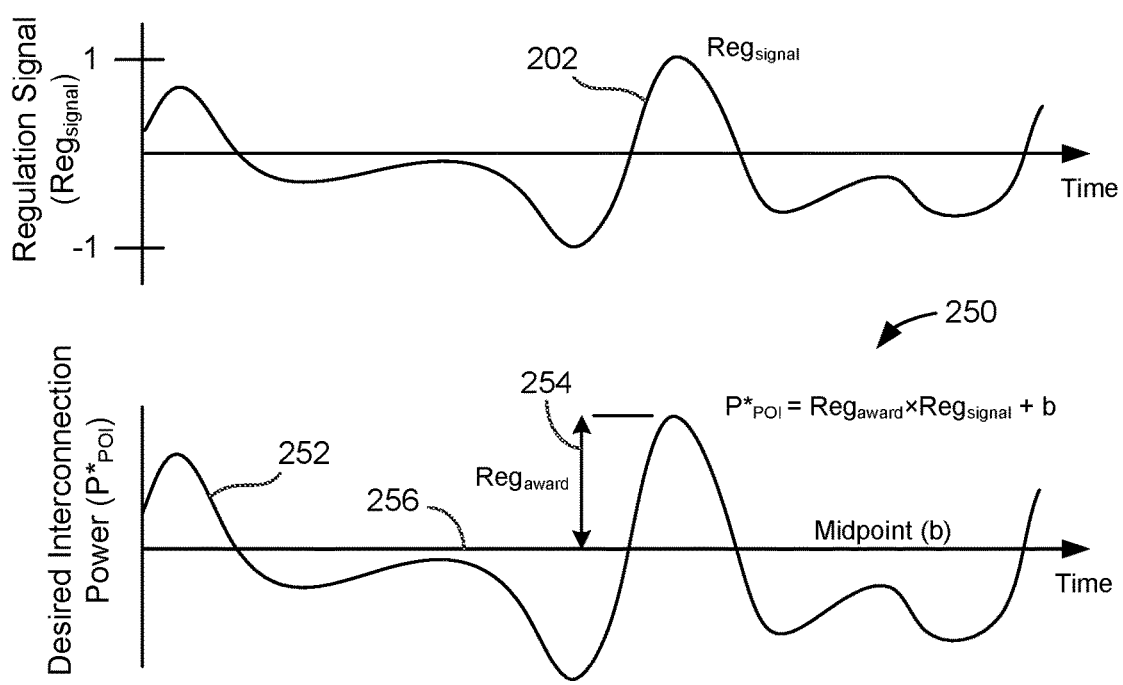
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., −1≤ $Reg_{signal}$≤1). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}$=0.5) may indicate that system 100 is requested to add 5 MW of power at POI 110 relative to midpoint b (e.g., $P^*_{POI}$=10 MW×0.5+b), whereas a regulation signal value of −0.3 may indicate that system 100 is requested to remove 3 MW of power from POI 110 relative to midpoint b (e.g., $P^*_{POI}$=10 MW×−0.3+b).

Graph 250 illustrates the desired interconnection power $P^*_{POI}$ 252 as a function of time. $P^*_{POI}$ 252 may be calculated by frequency response controller 112 based on $Reg_{signal}$ 202, $Reg_{award}$ 254, and a midpoint b 256. For example, controller 112 may calculate $P^*_{POI}$ 252 using the following equation:

$$P^*_{POI} = Reg_{award} \times Reg_{signal} + b$$

where $P^*_{POI}$ represents the desired power at POI 110 (e.g., $P^*_{POI}$=$P_{sup}$+$P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No.

15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P^*_{POI} = Reg_{award} \times Reg_{signal} + b$$

where $P^*_{POI} = P_{sup} + P_{campus}$. Positive values of $P^*_{POI}$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P^*_{POI} = Reg_{award} \times Res_{FR} + b$$

where $Res_{FR}$ is an optimal frequency response generated by optimizing a value function. Controller 112 may subtract $P_{campus}$ from $P^*_{POI}$ to generate the power setpoint for power inverter 106 (i.e., $P_{sup} = P^*_{POI} - P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
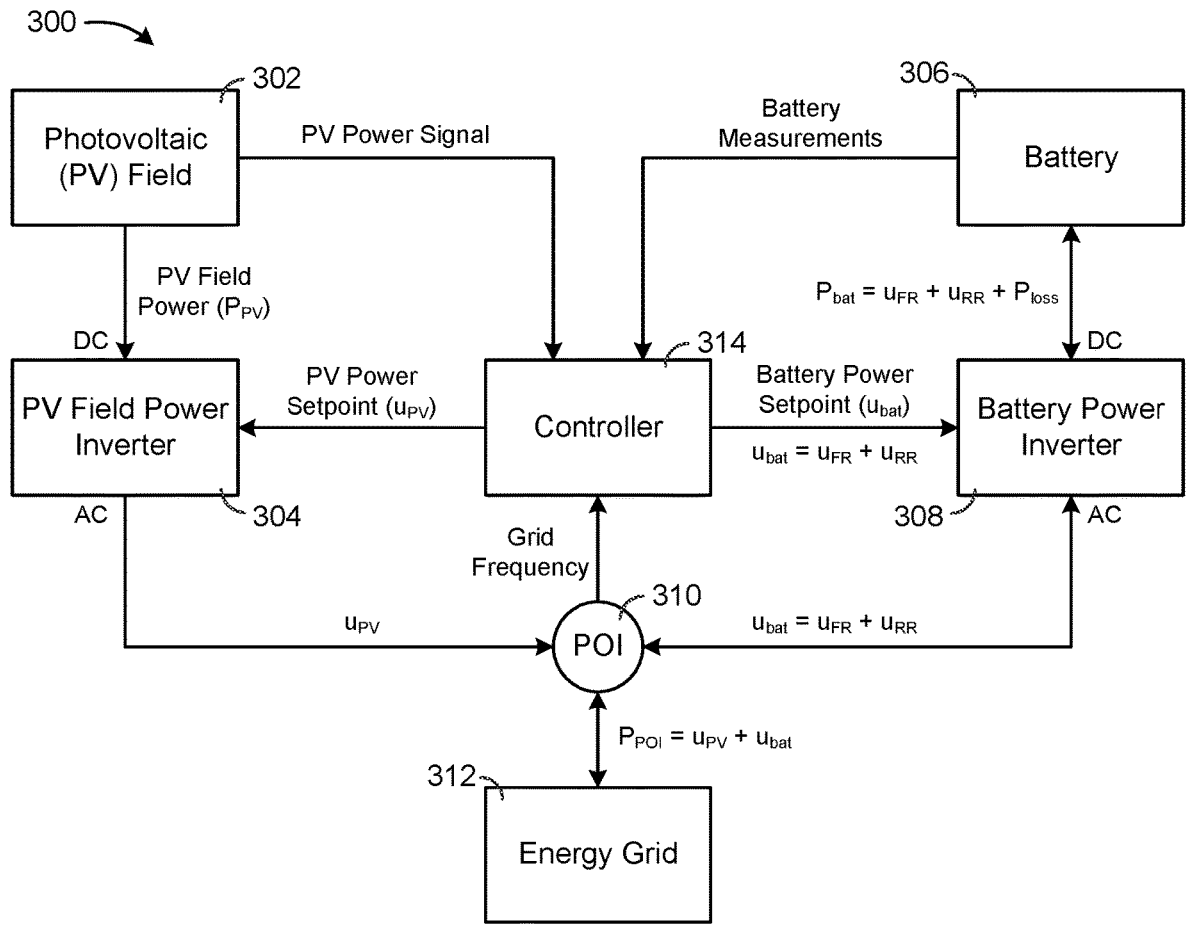
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
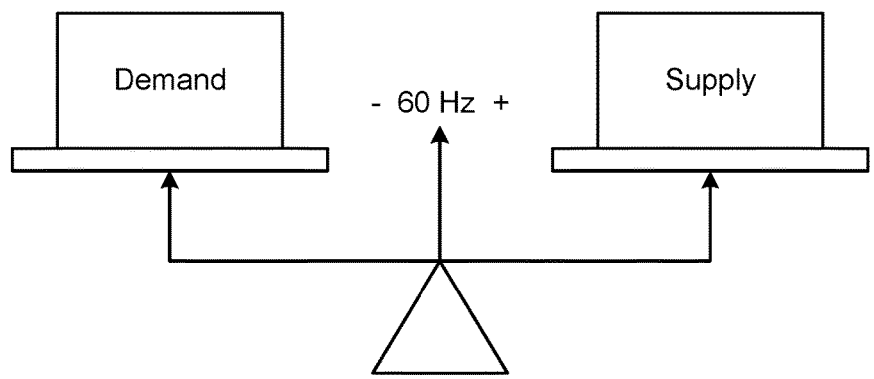
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5A:
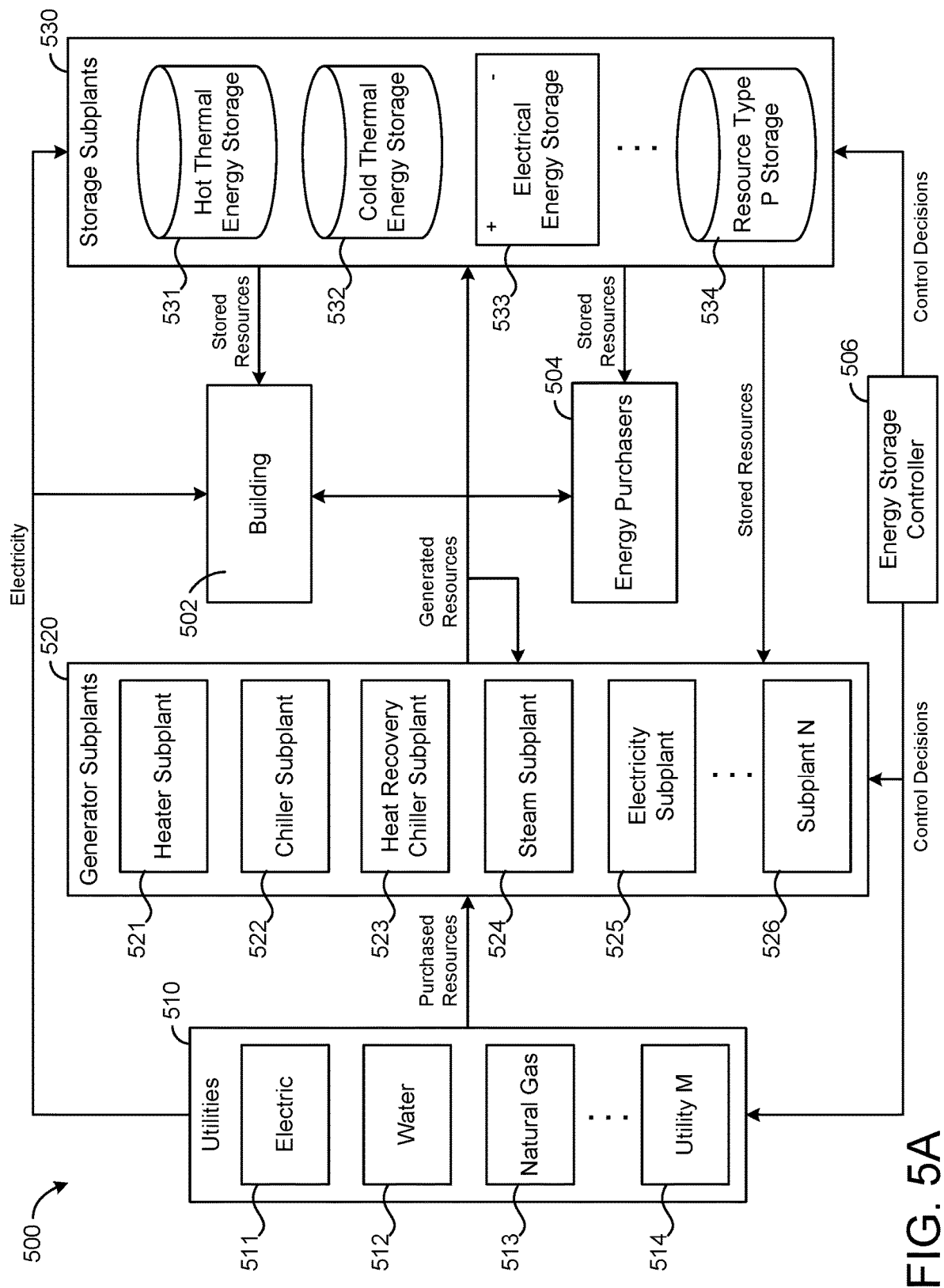
FIG. 5A is a block diagram of an energy storage system including thermal energy storage and electrical energy storage, according to an exemplary embodiment.

Referring now to FIG. 5A, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5A, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Cost Optimization System

Figure 5B:
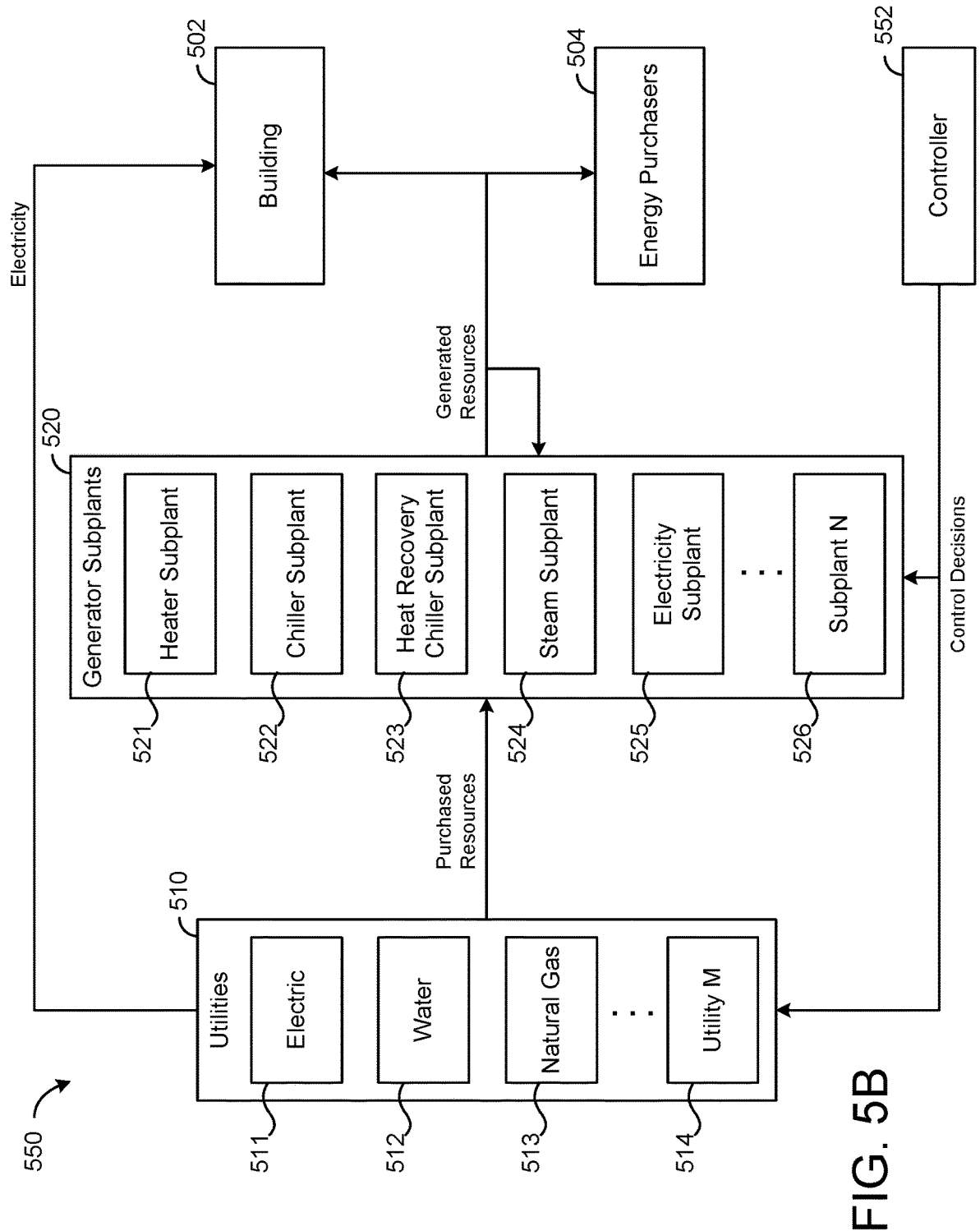
FIG. 5B is a block diagram of an energy cost optimization system without thermal or electrical energy storage, according to an exemplary embodiment.

Referring now to FIG. 5B, a block diagram of an energy cost optimization system 550 is shown, according to an exemplary embodiment. Energy cost optimization system 550 is shown to include many of the same components as energy storage system 500 (described with reference to FIG.

5A) with the exception of storage subplants 530. System 550 is an example of a system without thermal or electrical energy storage in which the peak load contribution cost optimization techniques can be implemented.

Energy cost optimization system 550 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy cost optimization system 550. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy cost optimization system 550 operates to satisfy the resource demand associated with building 502.

Energy cost optimization system 550 is shown to include a plurality of utilities 510. Utilities 510 may provide system 550 with resources such as electricity, water, natural gas, or any other resource that can be used by system 550 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.) or provided directly to building 502. For example, utilities 510 are shown providing electricity directly to building 502.

Energy cost optimization system 550 is shown to include a plurality of generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510 and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be provided to building 502, sold to energy purchasers 504, and/or used by other generator subplants 520. For example, the electricity generated by electricity subplant 525 may be used by chiller subplant 522 to generate cold thermal energy, provided to building 502, and/or sold to energy purchasers 504.

Still referring to FIG. 5B, energy cost optimization system 550 is shown to include a controller 552. Controller 552 may be configured to control the distribution, production, and usage of resources in system 550. In some embodiments, controller 552 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to sell to energy purchasers 504, and/or an optimal amount of each resource to provide to building 502. In some embodiments, the control decisions include an optimal amount of each input resource and output resource for each of generator subplants 520.

Controller 552 may be configured to maximize the economic value of operating energy cost optimization system 550 over the duration of the optimization period. The economic value may be defined by a value function that expresses economic value as a function of the control decisions made by controller 552. The value function may account for the cost of resources purchased from utilities 510, revenue generated by selling resources to energy purchasers 504, and the cost of operating system 550. In some embodiments, the cost of operating system 550 includes a cost of excessive equipment start/stops during the optimization period.

Each of subplants 520 may include equipment that can be controlled by controller 552 to optimize the performance of system 550. Subplant equipment may include, for example, heating devices, chillers, heat recovery heat exchangers, cooling towers, pumps, valves, and/or other devices of subplants 520. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from controller 552.

In some embodiments, one or more of subplants 520 includes a subplant level controller configured to control the equipment of the corresponding subplant. For example, controller 552 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, energy cost optimization system 550 and controller 552 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6A:
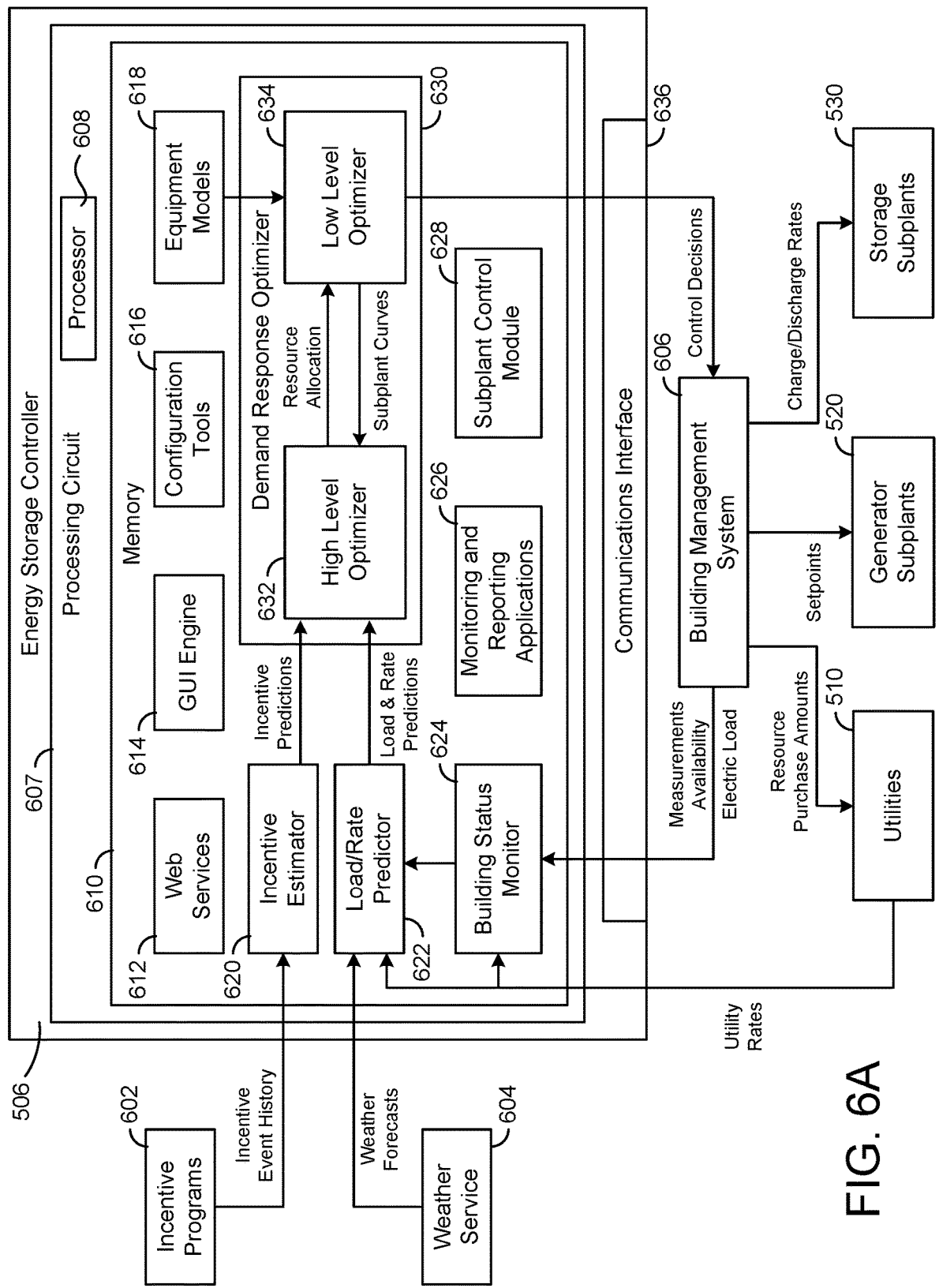
FIG. 6A is block diagram of an energy storage controller which may be used to operate the energy storage system of FIG. 5A, according to an exemplary embodiment.

Referring now to FIG. 6A, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6A, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6A, memory 610 is shown to include a load/rate predictor 622. Load/rate predictor 622 may be configured to predict the thermal energy loads ($\hat{\ell}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6A, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6A, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6A, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6A, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Energy Cost Optimization Controller

Figure 6B:
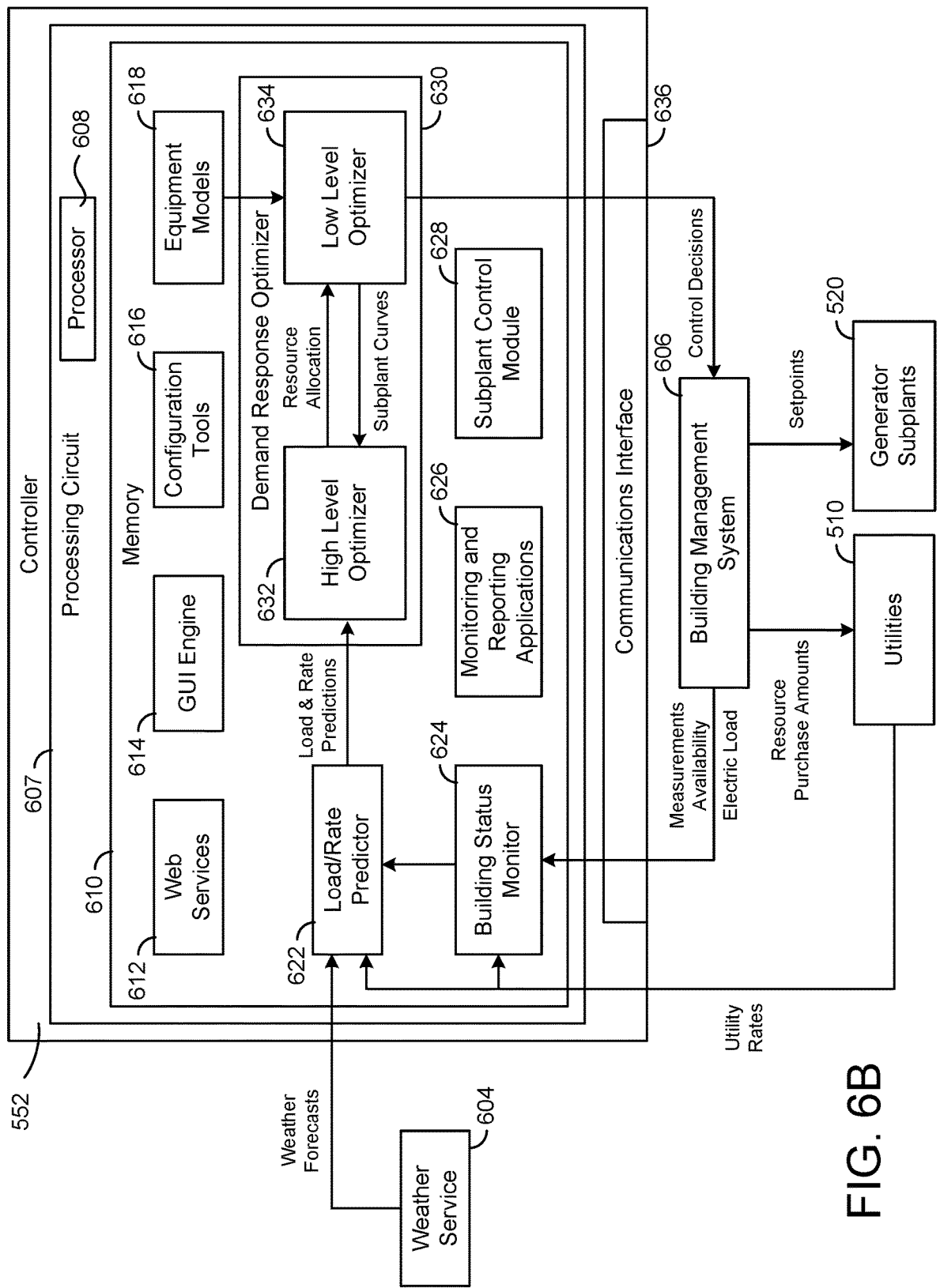
FIG. 6B is a block diagram of a controller which may be used to operate the energy cost optimization system of FIG. 5B, according to an exemplary embodiment.

Referring now to FIG. 6B, a block diagram illustrating controller 552 in greater detail is shown, according to an exemplary embodiment. Controller 552 is shown providing control decisions to a building management system (BMS) 606. In some embodiments, BMS 606 is the same or similar the BMS described with reference to FIG. 1. The control decisions provided to BMS 606 may include resource purchase amounts for utilities 510 and/or setpoints for generator subplants 520.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to controller 552. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520 to affect the monitored conditions within the building and to serve the thermal energy loads of the building.

BMS 606 may receive control signals from controller 552 specifying on/off states and/or setpoints for the subplant equipment. BMS 606 may control the equipment (e.g., via actuators, power relays, etc.) in accordance with the control signals provided by controller 552. For example, BMS 606 may operate the equipment using closed loop control to achieve the setpoints specified by energy storage controller 552. In various embodiments, BMS 606 may be combined with controller 552 or may be part of a separate building management system. According to an exemplary embodiment, BMS 606 is a METASYS® brand building management system, as sold by Johnson Controls, Inc.

Controller 552 may monitor the status of the controlled building using information received from BMS 606. Controller 552 may be configured to predict the thermal energy loads (e.g., heating loads, cooling loads, etc.) of the building for plurality of time steps in an optimization period (e.g., using weather forecasts from a weather service 604). Controller 552 may generate control decisions that optimize the economic value of operating system 550 over the duration of the optimization period subject to constraints on the optimization process (e.g., energy balance constraints, load satisfaction constraints, etc.). The optimization process performed by controller 552 is described in greater detail below.

Controller 552 is shown to include a communications interface 636 and a processing circuit 607 having a processor 608 and memory 610. These components may be the same as described with reference to FIG. 6A. For example, controller 552 is shown to include demand response optimizer 630. Demand response optimizer 630 may perform a cascaded optimization process to optimize the performance of system 550. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, resource purchase amounts for each type of resource purchased from utilities 510, and/or an amount of each resource sold to energy purchasers 504. In other words, the control decisions may define resource allocation at each time step.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. The cascaded optimization process performed by demand response optimizer 630 is described in greater detail in U.S. patent application Ser. No. 15/247,885. These and other components of controller 552 may be the same as previously described with reference to FIG. 6A.

Planning Tool

Figure 7:
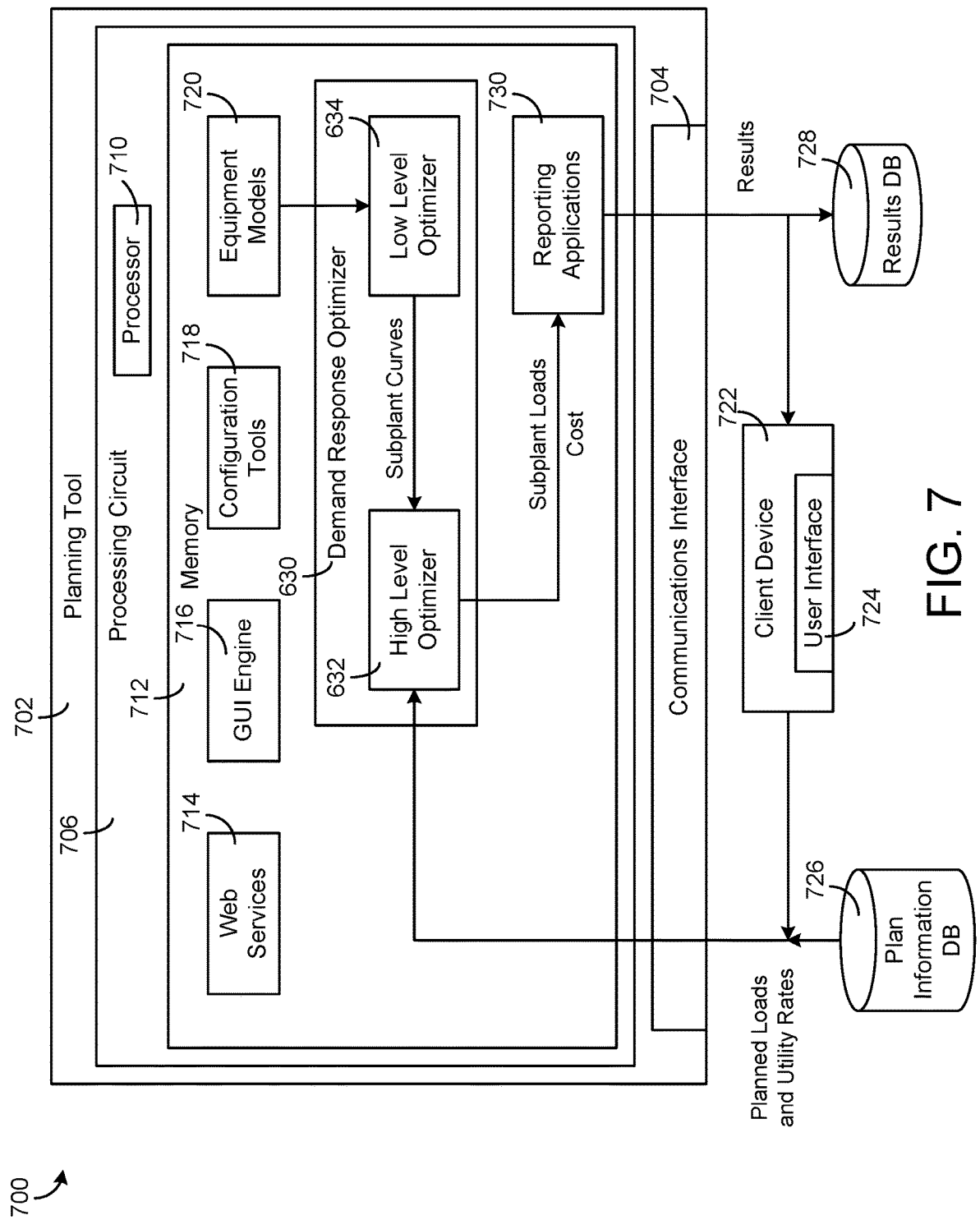
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIGS. 6A-6B. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5A. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
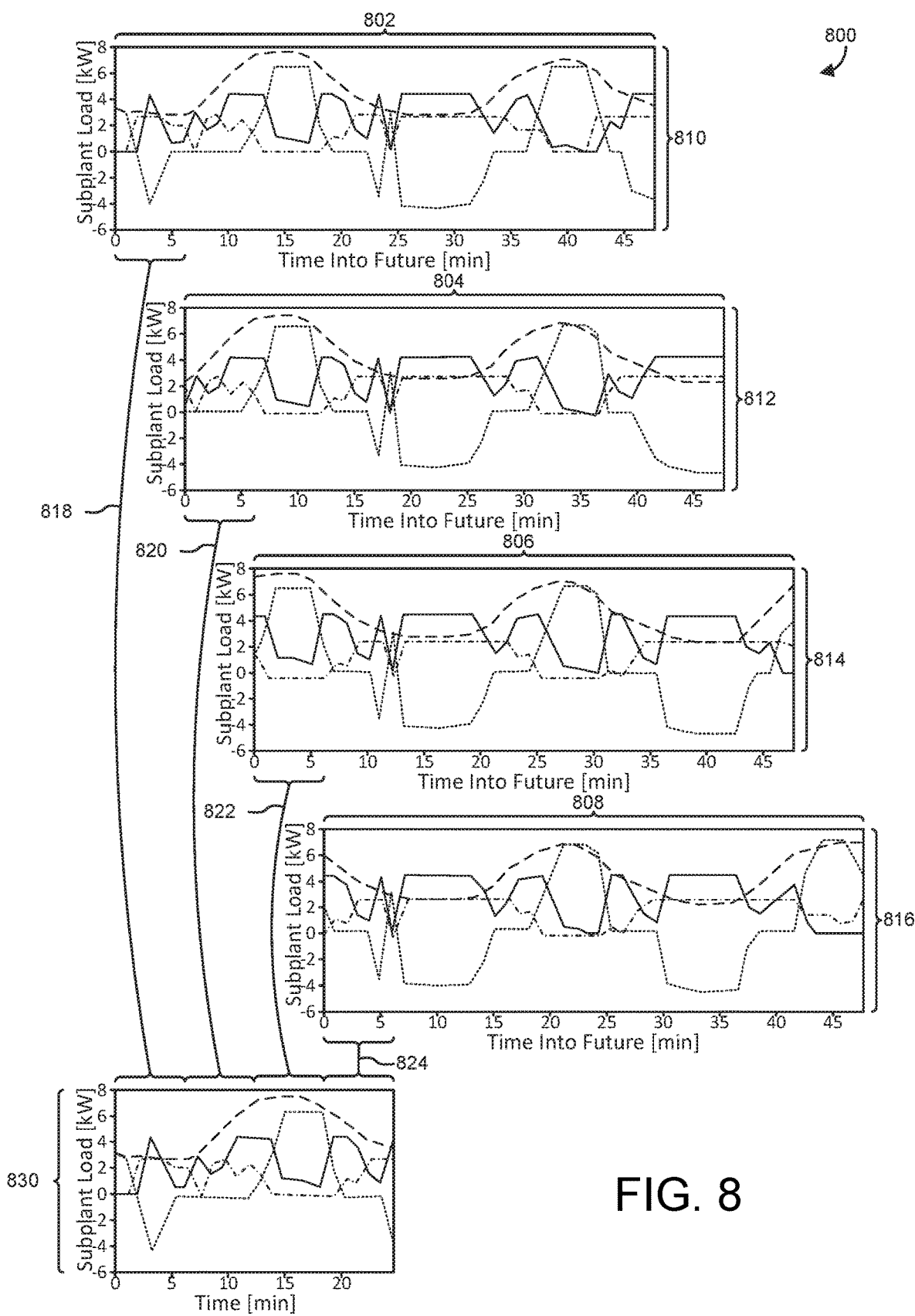
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Resource Allocation Optimization

Figure 9:
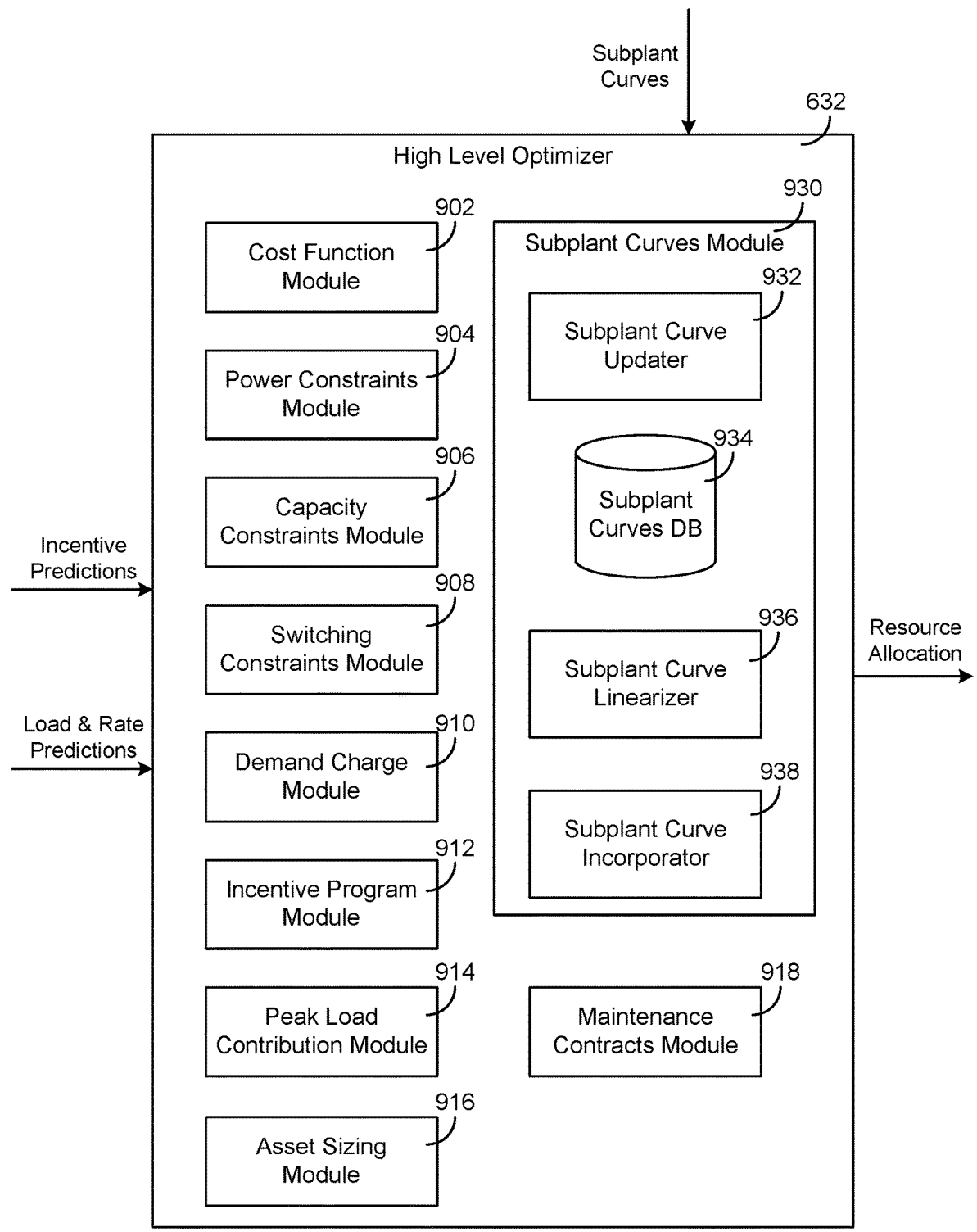
FIG. 9 is a block diagram of a high level optimizer which can be implemented as a component of the controllers of FIGS. 6A-6B or the planning tool of FIG. 7, according to an exemplary embodiment.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5A and 6A. In other embodiments, high level optimizer 632 may be implemented as a component of controller 552, as described with reference to FIGS. 5B and 6B. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for peak load contribution charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

Cost Function

Still referring to FIG. 9, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\arg\min_{x} J(x)$$

where $J(x)$ is defined as follows:

$$J(x) = \sum_{sources}\sum_{horizon} \text{cost}(\text{purchase}_{resource,time}, \text{time}) - \sum_{incentives}\sum_{horizon} \text{revenue}(\text{ReservationAmount})$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level optimizer 632 can optimize the cost function $J(x)$ subject to the following constraint, which guarantees the balance between resources purchased, produced, discharged, consumed, and requested over the optimization horizon:

$$\sum_{sources} \text{purchase}_{resource,time} + \sum_{subplants} \text{produce}(x_{internal,time}, x_{external,time}, v_{uncontrolled,time}) - \sum_{subplants} \text{consumes}(x_{internal,time}, x_{external,time}, v_{uncontrolled,time}) + \sum_{storages} \text{discharges}_{resource}(x_{internal,time}, x_{external,time}) - \sum_{sinks} \text{requests}_{resource} = 0 \quad \forall \text{ resources}, \forall \text{ time} \in \text{horizon}$$

where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{s \in sources} \left[ \sum_{q \in demands_s} w_{demand,s,q} r_{demand,s,q} \max_{i \in demands_{s,q}} (purchase_{s,i}) + \sum_{horizon} r_{s,i} purchase_{s,i} \right] - \sum_{incentives} \sum_{horizon} revenue(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $purchase_{s,i}$ indicates the amount of the resource purchased from source s during the ith time step of the optimization period.

In some embodiments, the energy system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} |P_{bat_i} - P_{bat_{i-1}}| + w_d r_d \max_i(-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., $/kWh) at time step i, $P_{FR,i}$ is the battery power (e.g., kW) committed to frequency regulation participation during time step i, $r_{FR_i}$ is the incentive rate (e.g., $/kWh) for participating in frequency regulation during time step i, $r_d$ is the applicable demand charge (e.g., $/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

Optimization Constraints

Still referring to FIG. 9, high level optimizer 632 is shown to include a power constraints module 904. Power constraints module 904 may be configured to impose one or more power constraints on the objective function J(x). In some embodiments, power constraints module 904 generates and imposes the following constraints:

$$P_{bat_i} + P_{FR_i} \leq P_{eff}$$

$$-P_{bat_i} + P_{FR_i} \leq P_{eff}$$

$$P_{bat_i} + P_{FR_i} \leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff} = P_{rated} - P_{PV\,FirmingReserve}$$

where $P_{rated}$ is the rated capacity of the battery and $P_{PV\,FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9, high level optimizer 632 is shown to include a capacity constraints module 906. Capacity constraints module 906 may be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR} P_{FR_i} \\ C_a - \sum_{n=k}^{i} P_{bat_n} \geq C_{FR} P_{FR_i} \end{cases} \forall i = k \ldots k+h-1$$

$$\begin{cases} C_a - \sum_{n=k}^{i} P_{bat_n} \leq C_{eff} - C_{FR} P_{FR_{i+1}} \\ C_a - \sum_{n=k}^{i} P_{bat_n} \geq C_{FR} P_{FR_{i+1}} \end{cases} \forall i = k \ldots k+h-2$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR}P_{FR_i}$ and the upper capacity bound $C_{eff}-C_{FR}P_{FR_i}$ for time step i. The lower capacity bound $C_{FR}P_{FR_i}$ represents the minimum capacity required to reserve $P_{FR_i}$ for frequency regulation during time step i, whereas the upper capacity bound $C_{eff}-C_{FR}P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff}-C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff}-C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff} = (1 - C_{FR} - 2C_{socCM})C_{rated} - C_{PV\,FirmingReserve}$$

where $C_{socCM}$ is the control margin and $C_{PV\,FirmingReserve}$ is the capacity reserved for photovoltaic firming.

Still referring to FIG. 9, high level optimizer 632 is shown to include a switching constraints module 908. Switching constraints module 908 may be configured to impose one or more switching constraints on the cost function J(x). As previously described, the cost function J(x) may include the following switching term:

$$\sum_{i=k}^{k+h-1} r_{s_i} |P_{bat_i} - P_{bat_{i-1}}|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i > P_{bat_i} - P_{bat_{i-1}}$$

$$s_i > P_{bat_{i-1}} - P_{bat_i} \quad \forall i = k \ldots k+h-1$$

Switching constraints module 908 can replace the nonlinear switching term in the cost function J(x) with the following linearized term:

$$\sum_{i=k}^{k+h-1} r_{s_i} s_i$$

which can be optimized using any of a variety of linear optimization techniques (e.g., linear programming) subject to the constraints on the auxiliary switching variable $s_i$.

Demand Charge Incorporation

Still referring to FIG. 9, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 910 may be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \cdots \sum_{s \in sources} \sum_{q \in demands_s} w_{demand,s,q} r_{demand,s,q} \max_{i \in demand_{s,q}} (purchase_{s,i}) \cdots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \cdots \sum_{s \in sources} \sum_{q \in demands_s} w_{demand,s,q} r_{demand,s,q} \max_{i \in demand_{s,q}} (g_{s,q,i} purchase_{s,i}) \cdots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q}=[0, 0, 0, 1, 1, 1, 1, 0, 0, 0, 1, 1]^T$$

where $g_{s,q,1}, g_{s,q,2}, g_{s,q,3}, g_{s,q,8}, g_{s,q,9}$, and $g_{s,q,10}$ have values of zero, whereas $g_{s,q,4}, g_{s,q,5}, g_{s,q,6}, g_{s,q,7}, g_{s,q,11}$, and $g_{s,q,12}$ have values of one. This indicates that the demand charge q is inactive during time steps i=1, 2, 3, 8, 9, 10 (i.e., $g_{s,q,i}=0$ ∀i=1, 2, 3, 8, 9, 10) and active during time steps i=4, 5, 6, 7, 11, 12 (i.e., $g_{s,q,i}=1$ ∀i=4, 5, 6, 7, 11, 12). Accordingly, the term $g_{s,q,i} purchase_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 910 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 910 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The following example illustrates how demand charge module 910 can incorporate multiple demand charges into the cost function J(x). In this example, a single source of electricity (e.g., an electric grid) is considered with multiple demand charges applicable to the electricity source (i.e., q=1 ... N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 910 can modify the cost function $J(x)$ to account for the N demand charges as shown in the following equation:

$$J(x) = \cdots + w_{d_1} r_{d_1} \max_i (g_{1_i}(-P_{bat_i} + eLoad_i)) + \cdots + w_{d_q} r_{d_q} \max_i (g_{q_i}(-P_{bat_i} + eLoad_i)) + \cdots + w_{d_N} r_{d_N} \max_i (g_{N_i}(-P_{bat_i} + eLoad_i))$$

where the term $-P_{bat_i} + eLoad_i$ represents the total amount of electricity purchased from the electric grid during time step i (i.e., the total electric load $eLoad_i$ minus the power discharged from the battery $P_{bat_i}$). Each demand charge q=1 ... N can be accounted for separately in the cost function $J(x)$ by including a separate max( ) function for each of the N demand charges. The parameter $r_{d_q}$ indicates the demand charge rate associated with the qth demand charge (e.g., \$/kW) and the weighting factor $w_{d_q}$ indicates the weight applied to the qth demand charge.

Demand charge module 910 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 910 linearizes the demand charge terms of the cost function $J(x)$ by introducing an auxiliary variable $d_q$ for each demand charge q. In the case of the previous example, this will result in N auxiliary variables $d_1 \ldots d_N$ being introduced as decision variables in the cost function $J(x)$. Demand charge module 910 can modify the cost function $J(x)$ to include the linearized demand charge terms as shown in the following equation:

$$J(x) = \ldots + w_{d_1} r_{d_1} d_1 + \ldots + w_{d_q} r_{d_q} d_q + \ldots + w_{d_N} r_{d_N} d_N$$

Demand charge module 910 can impose the following constraints on the auxiliary demand charge variables $d_1 \ldots d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall i = k \ldots k+h-1, \; g_{1_i} \neq 0$$
$$d_1 \geq 0$$
$$\vdots$$
$$d_q \geq g_{q_i}(-P_{bat_i} + eLoad_i) \quad \forall i = k \ldots k+h-1, \; g_{q_i} \neq 0$$
$$d_q \geq 0$$
$$\vdots$$
$$d_N \geq g_{N_i}(-P_{bat_i} + eLoad_i) \quad \forall i = k \ldots k+h-1, \; g_{N_i} \neq 0$$
$$d_N \geq 0$$
$$\vdots$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 \$/kWh which applies to all hours within the entire month. The second demand charge is an on-peak monthly demand charge of 1.56 \$/kWh which applies each day from 12:00-18:00. The third demand charge is a partial-peak monthly demand charge of 0.53 \$/kWh which applies each day from 9:00-12:00 and from 18:00-22:00.

For an optimization period of one day and a time step of one hour (i.e., i=1 ... 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 ... 3), where $g_q$ includes an element for each time step of the optimization period (i.e., $g_q = [g_{q_1} \ldots g_{q_{24}}]$). The three demand charge masks can be defined as follows:

$$g_{1_i} = 1 \; \forall i = 1 \ldots 24$$

$$g_{2_i} = 1 \; \forall i = 12 \ldots 18$$

$$g_{3_i} = 1 \; \forall i = 9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function $J(x)$ and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two. These and other features of demand charge module 910 are described in greater detail in U.S. patent application Ser. No. 15/405,236 filed Jan. 12, 2017, the entire disclosure of which is incorporated by reference herein.

Incentive Program Incorporation

Referring again to FIG. 9, high level optimizer 632 is shown to include an incentive program module 912. Incentive program module 912 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, energy storage system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, energy storage system 500 may reduce its demand for resources from a utility as part of a load shedding program. It is contemplated that energy storage system 500 may participate in any number and/or type of IBDR programs.

In some embodiments, incentive program module 912 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} (adjCBL_i - (eLoad_i - P_{bat_i})) \right)$$

where $b_1$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3}\left(eLoad_p - P_{bat_p} - \sum_{l=1}^{4} \frac{e_{lp}}{4}\right) - (eLoad_i - P_{bat_i}) \right) \right)$$

where $e_{li}$ and $e_{lp}$ are the electric loads at the lth hour of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \forall i/r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 912 to determine when to participate in ELDR, incentive program module 912 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} +$$

$$\sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

Peak Load Contribution Incorporation

Still referring to FIG. 9, high level optimizer 632 is shown to include a peak load contribution module 914. Peak load contribution (PLC) is a customer's contribution to regional demand peaks that occur in geographic area managed by a regional transmission organization (RTO) or independent system operator (ISO) at certain hours within a base period. The regional demand at a given hour may be the summation of the customer's demand during (i.e., the rate at which the customer purchases electricity or another resource from a utility) as well as the demand of other buildings in the geographic area during that hour. The customer may be billed based on its contribution to the peak regional demand (e.g., $/kW of the customer's PLC) in addition to the energy consumption charges and demand charges previously described.

PLC module 914 can be configured to modify the cost function J(x) to account for a cost associated with the customer's PLC. By incorporating PLC costs into the cost function J(x), PLC module 914 enables high level optimizer 632 to allocate resource consumption and resource purchases to reduce the customer's PLC. High level optimizer 632 can reduce PLC costs by shifting the customer's load to non-peak times or shaving the customer's peak load. This can be done, for example, by precooling the building during non-peak times, using thermal energy storage, and/or using electrical energy storage such as a battery asset.

Accounting for the cost associated with the customer's PLC can be more difficult than accounting for energy consumption costs and demand charges. Unlike demand charge which is calculated based on the customer's maximum demand during predetermined demand charge periods, the hours over which PLC is calculated may not be known in advance. The hours of peak regional demand (i.e., the coincidental peak (CP) hours) may not be known until the end of the base period over which PLC is calculated. For example, the CP hours for a given base period (e.g., one year) may be determined by a RTO at the end of the base period based on the demand of all the buildings within the geographic area managed by the RTO during the base period (e.g., by selecting the hours with the highest regional demand). The customer's PLC may then be determined based on the customer's demand during the designated CP hours and used to calculate a cost of the customer's PLC. This cost may then be billed to the customer during the next time period (e.g., the next year), referred to as the billing period.

Another difficulty in accounting for PLC costs is that the base period, billing period, CP hours, and other factors used to calculate the PLC cost may differ from one RTO to another. For example, a RTO for the Pennsylvania, Jersey, and Maryland (PJM) geographic area may define the base period (i.e., the peak-setting period) as June $1^{st}$ of year Y to May $31^{st}$ of year Y+1. The billing period (i.e., the delivery period) may be defined as June $1^{st}$ of year Y+1 to May $31^{st}$ of year Y+2. PJM may define the CP hours as the five hours with the highest loads over the five highest peak load days across the PJM geographic region.

A customer's PLC in the PJM region may be calculated as the product of the customer's average electric load during the five CP hours and a capacity loss factor (CLF), as shown in the following equation:

$$PLC_{customer} = CLF \times \sum_{i=1}^{5} \frac{eLoad_{cp_i}}{5}$$

where $PLC_{customer}$ is the customer's peak load contribution calculated during year Y, CLF is the capacity loss factor (e.g., CLF=1.05), and $eLoad_{cp_i}$ is the customer's electric load (e.g., kW) during the ith CP hour.

The customer's PLC cost in the PJM region can be calculated as the product of the customer's PLC during year Y and a PLC rate, as shown in the following equation:

$$PLC_{cost} = r_{PLC} \times PLC_{customer}$$

where $PLC_{cost}$ is the customer's PLC charge billed over the delivery year Y+1 (e.g., $) and $r_{PLC}$ is the rate at which the customer is charged for its PLC (e.g., $/kW).

An additional complication in the PJM region relates to the interaction between PLC costs and economic load demand response (ELDR) revenue. In some embodiments, a customer participating in ELDR in the PJM region during one of the CP hours may be prohibited from reducing its PLC while earning ELDR revenue at the same time. Accordingly, a customer wishing to reduce its load during an assumed CP hour for the purpose of reducing its capacity, transmission, and/or demand charge costs may be restricted from making a bid for the same assumed CP hour in the ELDR market.

Another example of an organization which imposes PLC costs is the independent electricity system operator (IESO)

in Ontario, Canada. Relative to PJM, IESO may use a different base period, billing period, CP hours, and other factors used to calculate the PLC cost. For example, IESO may define the base period or peak-setting period as May $1^{st}$ of year Y to April $30^{th}$ of year Y+1. The billing period or adjustment period for IESO may be defined as July $1^{st}$ of year Y+1 to June $30^{th}$ of year Y+2. IESO may define the CP hours as the five hours with the highest regional demands across the IESO geographic region.

At the end of the base period, IESO may calculate the customer's peak demand factor ($\theta_{PDF}$). The peak demand factor may be defined as the ratio of the sum of the customer's peak demand to the sum of the region-wide demand peaks during the five CP hours, as shown in the following equation:

$$\theta_{PDF} = \frac{\sum_{i=1}^{5} eLoad_{cp_i}}{\sum_{i=1}^{5} sysLoad_{cp_i}}$$

where $sysLoad_{cp_i}$ is the region-wide peak load during the ith CP hour and $eLoad_{cp_i}$ is the customer's peak load during the ith CP hour.

The customer's PLC cost in the IESO region is known as a global adjustment (GA) charge. The GA charge may be imposed as a monthly charge during the billing period. In some embodiments, the GA charge is calculated by multiplying the customer's peak demand factor by the monthly region-wide global adjustment costs, as shown in the following equation:

$$GA_{cost,month} = \theta_{PDF} \times GA_{total,month}$$

where $GA_{cost,month}$ is the customer's monthly PLC cost (e.g., $) and $GA_{total,month}$ is the region-wide global adjustment cost (e.g., $). The value of $GA_{total,month}$ may be specified by IESO. In some embodiments, $GA_{total,month}$ has a known value. In other embodiments, the value of $GA_{total,month}$ may not be known until the end of the base period.

In order to incorporate PLC costs into the cost function J(x) and allocate resource consumption/purchases in advance, PLC module 914 can generate or obtain a projection of the CP hours for an upcoming base period. The projected CP hours can then be used by high level optimizer 632 as an estimate of the actual CP hours. High level optimizer 632 can use the projected CP hours to allocate one or more assets (e.g., a battery, thermal energy storage, HVAC equipment, etc.) to minimize the customer's demand during the projected CP hours. These and other features of PLC module 914 are described in greater detail in U.S. patent application Ser. No. 15/405,234 filed Jan. 12, 2017, the entire disclosure of which is incorporated by reference herein.

Asset Sizing Incorporation

Still referring to FIG. 9, high level optimizer 632 is shown to include an asset sizing module 916. Asset sizing module 916 can be configured to determine the optimal sizes of various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. Asset sizing module 916 can be configured to determine the maximum loading and/or the maximum capacity of an asset when determining the optimal size of the asset.

In some embodiments, asset sizing module 916 is implemented a component of planning tool 702. In the planning tool framework, asset sizing module 916 can determine the optimal size of an asset for a given application. For example, consider the planning problem described with reference to FIGS. 7-8 in which the high level optimization is solved at a given time instant k over a given time horizon h. With each iteration of the high level optimization, the time horizon h can be shifted forward by a block size equivalent to b time steps and the first b sets of decision variables may be retained. In such a planning problem, the sizes of the assets to be optimally allocated are typically given along with historical load data, utility pricing, and other relative data. However, there are many cases in which the sizes of the assets to be allocated are unknown. For example, when purchasing a new asset for a given application (e.g., adding thermal energy storage or electrical energy storage to a building or central plant), a user may wish to determine the optimal size of the asset to purchase.

Asset sizing module 916 can be configured to determine the optimal size of an asset by considering the potential benefits and costs of the asset. Potential benefits can include, for example, reduced energy costs, reduced demand charges, reduced PLC charges, and/or increased revenue from participating in IBDR programs such as frequency regulation (FR) or economic load demand response (ELDR). Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by the original cost function J(x). For example, the cost function J(x) may include terms corresponding to energy cost, multiple demand charges, PLC charges, and/or IBDR revenue, as previously described. Adding one or more new assets may affect the values of some or all of these terms in the original cost function J(x). For example, adding a battery asset may increase IBDR revenue and decrease energy cost, demand charges, and PLC charges. However, the original cost function J(x) may not account for the fixed and marginal costs resulting from new asset purchases. In order to account for these fixed and marginal costs, asset sizing module 916 may add new terms to the original cost function J(x).

Asset sizing module 916 can be configured to augment the cost function J(x) with two new terms that correspond to the cost of purchasing the new assets, resulting in an augmented cost function $J_a(x)$. The additional terms are shown in the following equation:

$$J_a(x) = (x) + c_f^T v + c_s^T s_a$$

where J(x) is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_a(x)$.

In some embodiments, asset sizing module 916 scales the asset purchase costs $c_f^T v$ and $c_s^T s_a$ to the duration of the optimization period h. The cost of purchasing an asset is typically paid over an entire payback period SPP, whereas the operational cost is only over the optimization period h. In order to scale the asset purchase costs to the optimization period, asset sizing module 916 can multiply the terms $c_f^T v$ and $c_s^T s_a$ by the ratio $$\frac{h}{SPP}$$

as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

High level optimizer 632 can perform an optimization process to determine the optimal values of each of the binary decision variables in the vector v and each of the continuous decision variables in the vector $s_a$. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector $s_a$. These and other features of asset sizing module 916 are described in greater detail in U.S. patent application Ser. No. 15/426,962 filed Feb. 7, 2017, the entire disclosure of which is incorporated by reference herein.

Maintenance Contracts Incorporation

Still referring to FIG. 9, high level optimizer 632 is shown to include a maintenance contracts module 918. Maintenance contracts module 918 can be configured to modify the cost function J(x) to account for a cost associated with maintenance contracts for various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Maintenance contracts module 918 can be configured to modify the cost function J(x) to include a maintenance cost term. The maintenance cost term may account for an economic or monetary cost (e.g., dollars) of performing maintenance on the assets. An example of a modified cost function $J_a(x)$ which can be generated by maintenance contracts module 918 is shown in the following equation:

$$J_a(x) = J(x) + \sum_{k \in horizon} c_{hourly} b_k$$

where J(x) is the original cost function, $c_{hourly}$ is the hourly cost of maintenance, and $b_k$ is a binary variable representing the on/off state of the asset at hour k of the optimization period. For example, $b_k$ may have a value of $b_k=1$ if the asset is on during hour k or a value of $b_k=0$ if the asset is off during hour k. The modified cost function can be expressed in matrix form as follows:

$$J_a(x) = J(x) + c_{hourly} b$$

where b is a vector of binary variables having an element for each hour k of the optimization period. The binary variables $b_k$ and the vector b may be decision variables to be optimized by high level optimizer 632 as part of the high level optimization process. The value of $c_{hourly}$ may be determined by maintenance contracts module 918, as described in detail below.

Although $c_{hourl}$ is described as an hourly cost and each time step k is described as one hour, it should be understood that the time period associated with the cost and the time step can have any duration. For example, $c_{hourly}$ can be replaced with a daily cost, a monthly cost, a yearly cost, a cost per half hour, a cost per quarter hour, or a cost associated with any other duration. Similarly, the duration of each time step k can be a quarter hour, a half hour, an hour, a day, a month, or any other duration. The same techniques can be used to augment the cost function J(x) with a maintenance cost term regardless of the duration of time step k and the time period associated with $c_{hourly}$.

Many assets have a fixed maintenance schedule that is dependent on the number of run hours since the last time the maintenance was performed. For example, the maintenance schedule for a chiller may involve cleaning the chiller tubes every X run hours (e.g., every 5000 run hours). A fixed cost $C may be incurred each time the maintenance is performed. For fixed maintenance schedules, maintenance contracts module 918 can determine the hourly cost $c_{hourly}$ by taking the maintenance cost $C and dividing by the number of run hours X between performances of the maintenance (e.g., $c_{hourly} = \$C/X$). Maintenance contracts module 918 can then incorporate the hourly cost of maintenance $c_{hourly}$ into the cost function $J_a(x)$ as a fixed cost per run hour of the asset.

In some scenarios, an owner of an asset might contract with a maintenance provider to perform maintenance under a fixed contract. In this case, the contract terms may specify a base cost $c_{base}$ which covers base number of run hours $t_{base}$ and a marginal cost $c_m$ for each hour that the asset is operated exceeding the base number of run hours $t_{base}$. For example, the contract might stipulate $500,000 dollars for the first 4,000 run hours and an additional $42 per hour exceeding 4,000 hours. The maintenance cost can be expressed as a piecewise-defined function, as shown in the following equation:

$$\text{AnnualCost} = \begin{cases} c_{base} & t < t_{base} \\ c_{base} + c_m(t - t_{base}) & t \geq t_{base} \end{cases}$$

where AnnualCost is the total maintenance cost per year, $c_{base}$ is the base cost, $t_{base}$ is the base number of hours covered by the base cost $c_{base}$, $c_m$ is the marginal cost for each run hour exceeding the base number of run hours $t_{base}$, and t is the number of run hours of the asset. Incorporating this type of maintenance contract into the optimization algorithm can be significantly more complicated than incorporating a fixed cost per run hour.

Maintenance contracts module 918 can be configured to determine the value of $c_{hourly}$ that will yield the optimal solution to the high level optimization problem. The value of $c_{hourly}$ may reflect the true hourly cost of maintenance when the cost changes from an already sunk cost with no marginal cost to a marginal cost of $c_m$ after the equipment has be used for a stipulated number of run hours. Maintenance contracts module 918 can use the value of $c_{hourly}$ to define the maintenance cost term in the modified cost function $J_a(x)$.

In some embodiments, maintenance contracts module 918 is configured to run in an offline mode (e.g., a planning mode) and an online mode (e.g., an operational mode). In the offline mode, maintenance contracts module 918 can perform several simulations of the year with assumed loads and utility costs (i.e., a planning run) with different values of $c_{hourly}$ in the cost function $J_a(x)$ to determine the value of $c_{hourly}$ that yields the optimal results under the terms of the maintenance contract. In the online mode, maintenance contracts module 918 can run the plan at different hourly costs $c_{hourly}$ to determine how to adjust the hourly cost $c_{hourly}$ at periodic times during the course of the year. This allows maintenance contracts module 918 to incorporate feedback as to how many of the base hours $t_{base}$ have actually been used as opposed to how many were expected to be used. Maintenance contracts module 918 can update the hourly cost $C_{hourly}$ throughout the year based on the actual number of run hours of the assets covered by the maintenance contracts.

In some embodiments, maintenance contracts module 918 is configured to account for the cost of maintenance contracts in terms of the total production of the asset rather than run hours. Total production can be defined as the amount of one or more resources produced by an asset. For example, the total production of a chiller may be the amount of chilled water produced by the chiller or the amount of cooling energy (e.g., tons) produced by the chiller over a given time period. Similarly, the total production of a boiler may be the amount of hot water produced by the boiler or the amount of heating energy (e.g., kWh) produced by the boiler over a given time period.

A maintenance contract may specify a base cost $c_{base}$ which covers a base amount of production $\hat{\ell}_{base}$ and a marginal cost $c_m$ for each unit of production exceeding the base production $\hat{\ell}_{base}$. For example, the contract might stipulate $10,000 dollars for the first 100,000 kWh of production and an additional $0.1 per kWh exceeding 100,000 kWh. The maintenance cost can be expressed as a piecewise-defined function, as shown in the following equation:

$$\text{AnnualCost} = \begin{cases} c_{base} & \hat{\ell} < \hat{\ell}_{base} \\ c_{base} + c_m(\hat{\ell} - \hat{\ell}_{base}) & \hat{\ell} \geq \hat{\ell}_{base} \end{cases}$$

where AnnualCost is the total maintenance cost per year, $c_{base}$ is the base cost, $\hat{\ell}_{base}$ is the base amount of production covered by the base cost $c_{base}$, $c_m$ is the marginal cost for each unit of production exceeding the base amount of production $\hat{\ell}_{base}$, and $\hat{\ell}$ is the amount of production of the asset.

To account for the cost of maintenance contracts in terms of total production, maintenance contracts module 918 can augment the cost function $J(x)$ with a maintenance cost term that defines maintenance cost in terms of the production of the asset. An example of a modified cost function $J_a(x)$ which can be generated by maintenance contracts module 918 is shown in the following equation:

$$J_a(x) = J(x) + \sum_{k \in \text{horizon}} c_p p_k$$

where $J(x)$ is the original cost function, $c_p$ is the cost of maintenance per unit of production (e.g., $/kWh of energy, $/liter of hot or chilled water, etc.), and $P_k$ is a variable representing the production the asset at hour k of the optimization period. Maintenance contracts module 918 can be configured to determine the value of $c_p$ that will yield the optimal solution to the high level optimization problem.

Maintenance contracts module 918 can use the same techniques to account for the cost of maintenance contracts, regardless of whether the maintenance contracts define maintenance cost in terms of run hours or total production. For example, the variables $\hat{\ell}$, $\hat{\ell}_{base}$, $c_p$, and $p_k$ can be used in place of the variables t, $t_{base}$, $c_{hourly}$, and $b_k$, respectively, in any of the systems and methods described herein to account for maintenance costs in terms of total production.

These and other features of maintenance contracts module 918 are described in greater detail with reference to FIGS. 10-21B.

Subplant Curve Incorporation

Still referring to FIG. 9, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 may be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 may be configured to break the subplant curves into piecewise linear segments that combine to form a piecewise-defined convex curve. Subplant curve linearizer 936 may store the linearized subplant curves in subplant curves database 934.

Subplant curve incorporator 938 may be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 938 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 938 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 938 may determine that high level optimizer 632 is overusing electricity. In response to a determination that high level optimizer 632 is overusing electricity, subplant curve incorporator 938 may constrain the production of heat recovery chiller subplant 523 at its current value and constrain the electricity use of subplant 523 to the corresponding value on the subplant curve. High level optimizer 632 may then rerun the optimization with the new equality constraints. These and other features of subplant curves module 930 are described in greater detail in U.S. patent application Ser. No. 14/634,609 filed Feb. 27, 2015, the entire disclosure of which is incorporated by reference herein.

Maintenance Contracts Module

Figure 10:
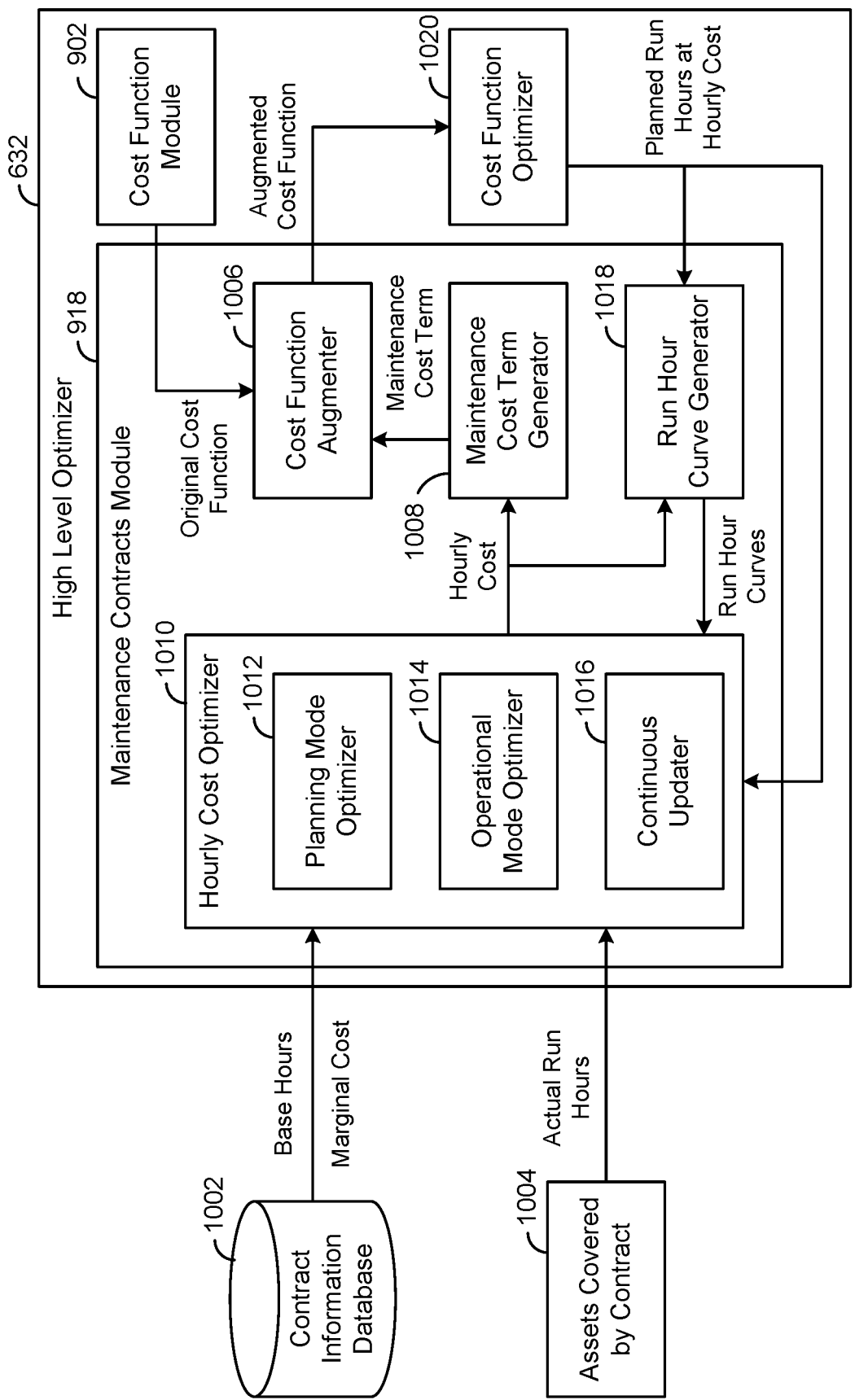
FIG. 10 is a block diagram illustrating the maintenance contracts module of FIG. 9 in greater detail, according to an exemplary embodiment.

Referring now to FIG. 10, a block diagram illustrating maintenance contracts module 918 in greater detail is shown, according to an exemplary embodiment. Maintenance contracts module 918 can be configured to modify the cost function J(x) to include a maintenance cost term. The maintenance cost term may account for the cost of performing maintenance on one or more assets 1004 covered by a maintenance contract. An example of a maintenance cost term which can be generated by maintenance contracts module 918 is:

$$\sum_{k \in horizon} c_{hourly} b_k$$

where $c_{hourly}$ is the hourly cost of maintenance and $b_k$ is a binary variable representing the on/off state of the assets 1004 covered by the maintenance contract at hour k. The binary variable $b_k$ for each hour k may be treated as decision variables to be optimized by high level optimizer 632 as part of the high level optimization process. The hourly cost of maintenance $C_{hourly}$ can be determined by maintenance contracts module 918 prior to performing the high level optimization process.

Maintenance contracts module 918 can add the maintenance cost term to the cost function J(x) to generate an augmented cost function $J_a(x)$, as shown in the following equation:

$$J_a(x) = J(x) + \sum_{k \in horizon} c_{hourly} b_k$$

The augmented cost function $J_a(x)$ can be optimized by a cost function optimizer 1020 to determine optimal values for the binary decision variables $b_k$ at each hour k of the optimization period, along with other decision variables in the cost function J(x).

As described above, the true maintenance cost may be based on the number of run hours of the covered assets 1004. For example, the maintenance cost can be expressed as a piecewise-defined function, as shown in the following equation:

$$\text{AnnualCost} = \begin{cases} c_{base} & t < t_{base} \\ c_{base} + c_m(t - t_{base}) & t \geq t_{base} \end{cases}$$

where AnnualCost is the total maintenance cost per year, $c_{base}$ is the base cost, $t_{base}$ is the base number of hours covered by the base cost $c_{base}$, $c_m$ is the marginal cost for each run hour exceeding the base number of run hours $t_{base}$, and t is the number of run hours of the covered assets 1004. Maintenance contracts module 918 can be configured to determine a value of $c_{hourly}$ that captures the true maintenance cost in a manner that allows high level optimizer 632 to determine optimal values of the binary decision variables $b_k$.

Still referring to FIG. 10, maintenance contracts module 918 is shown to include an hourly cost optimizer 1010. Hourly cost optimizer 1010 can be configured to determine the value of the hourly cost $c_{hourly}$ to include in the maintenance cost term of the augmented cost function $J_a(x)$. Hourly cost optimizer 1010 can determine a value of $c_{hourly}$ that accounts for an annual cost that is a function of both a base cost $c_{base}$ and the number run hours of the covered assets 1004 in excess of a base number of run hours $t_{base}$.

Consider a maintenance contract specifying the annual cost as shown in the previous piecewise-defined function. If the high level optimization were simulated over a year, there are three potential optimal solutions:

1. The optimal solution includes running covered assets 1004 for less than $t_{base}$ run hours.
2. The optimal solution includes running covered assets 1004 for more than $t_{base}$ run hours.
3. The optimal solution includes running covered assets 1004 for exactly $t_{base}$ run hours.

This trichotomy is specifically called out because each scenario has a particular way of finding the best value for $C_{hourly}$.

Scenario 1

If the optimal solution were to run the covered assets 1004 for less than $t_{base}$, then the best value for $C_{hourly}$ is zero. Consider running the high level optimization over a year with the hourly cost set to zero (i.e., $C_{hourly}=0$). If this simulation were to obtain a total run time less than $t_{base}$, then this is the optimal solution because the owner of assets 1004 is in actuality paying zero additional dollars per run hour. In other words, the actual marginal cost $c_m$ is equal to the hourly cost $c_{hourly}$ used by the optimization (i.e., $c_{hourly}=c_m=0$). The base cost $c_{base}$ is already a sunk cost (i.e., an offset) and need not be considered in the optimization.

On the other hand, the simulation with $c_{hourly}=0$ may obtain a total run time greater than $t_{base}$. In this case, the simulation is unlikely to be optimal because the owner of assets 1004 is paying $c_m$ per run hour above $t_{base}$, but high level optimizer 632 is not penalizing these run hours in any way. Thus, a run hour that provided a positive benefit that is less than the marginal cost $c_m$ for running assets 1004 would be executed, making the annual run suboptimal.

Scenario 2

If the optimal solution were to run the covered assets 1004 for more than $t_{base}$, then the best value for $c_{hourly}$ is $c_m$. Consider running the high level optimization over a year with the hourly cost set to $c_m$ (i.e., $c_{hourly}=c_m$). If this simulation were to obtain a total run time more than $t_{base}$, then this is the optimal solution because high level optimizer 632 is actually over-penalizing the number of run hours. The base number of run hours $t_{base}$ built into the contract would be charged a marginal cost of $c_m$ by high level optimizer 632 when in actuality the owner of assets 1004 does not pay the marginal cost $c_m$ for the run hours within $t_{base}$. If the high level optimization still selects a number of run hours greater than $t_{base}$ despite the over-penalization, then the selected number of run hours is optimal.

On the other hand, the simulation with $c_{hourly} = c_m$ may obtain a total run time less than $t_{base}$. In this case, the simulation is unlikely to be optimal because the owner of assets 1004 would pay zero cost for the additional run hours up to $t_{base}$, but high level optimizer 632 is penalizing those run hours at the marginal rate $c_m$. Thus, a run hour within the base number of run hours $t_{base}$ that provided a positive benefit that is less than $c_m$ for running assets 1004 would not be executed, making the annual run suboptimal.

Scenario 3

If neither an annual simulation with $c_{hourly} = 0$ yields a runtime less than $t_{base}$ nor an annual simulation with $c_{hourly} = c_m$ yields a run time of more than $t_{base}$ neither scenario 1 nor scenario 2 is true), then the optimal runtime is exactly $t_{base}$. The problem now becomes which of the $t_{base}$ hours provide the maximum benefit. This can be found by varying the hourly cost $c_{hourly}$. The optimal number of hours is $t_{base}$ and the optimal hours to run are those that provide a benefit greater than or equal to $c_{hourly}$ that causes exactly $t_{base}$ run hours to be selected by high level optimizer 632.

Still referring to FIG. 10, hourly cost optimizer 1010 is shown to include a planning mode optimizer 1012, an operational mode optimizer 1014, and a continuous updater 1016. Planning mode optimizer 1012 can be configured to determine the optimal value of $c_{hourly}$ when operating in a planning mode (i.e., an offline mode). Operational mode optimizer 1014 can be configured to periodically update the value of $C_{hourly}$ when operating in an operational mode (i.e., an online mode). Continuous updater 1016 can be configured to continuously update $C_{hourly}$ after each hour k when operating in the operational mode.

Both the planning mode and the operational mode may revolve around performing a planning simulation with several different hourly costs $C_{hourly}$ and generating a run hour curve as a function of the hourly cost $C_{hourly}$. For example, hourly cost optimizer 1010 can generate several different values of $C_{hourly}$ between $C_{hourly} = 0$ and $C_{hourly} = C_m$. Each value of $c_{hourly}$ can be provided to maintenance cost term generator 1008. Maintenance cost term generator 1008 can use the values of $C_{hourly}$ to generate several different maintenance cost terms in the augmented cost function $J_a(x)$. Each maintenance cost term may have the form $\Sigma_{k \in horizon} c_{hourly} b_k$ and may include a different value of $C_{hourly}$. Maintenance cost term generator 1008 may provide all of the maintenance cost terms to cost function augmenter 1006.

Cost function augmenter 1006 may add each of the maintenance cost terms to the original cost function $J(x)$ provided by cost function module 902 to generate several different augmented cost functions $J_a(x)$. Each augmented cost function $J_a(x)$ may be a linear combination of the original cost function $J(x)$ and one of the maintenance cost terms. Cost function optimizer 1020 can optimize each augmented cost function $J_a(x)$ to determine optimal values for the binary decision variables $b_k$. Each set of optimized binary decision variables $b_k$ may correspond to one of the values of $c_{hourly}$ and may indicate the planned run hours for assets 1004 at the corresponding hourly cost value $c_{hourly}$. Cost function optimizer 1020 can provide the sets of optimized binary decision variables $b_k$ and/or the total number of run hours indicated by each set of binary decision variables $b_k$ to run hour curve generator 1018.

Figure 11:
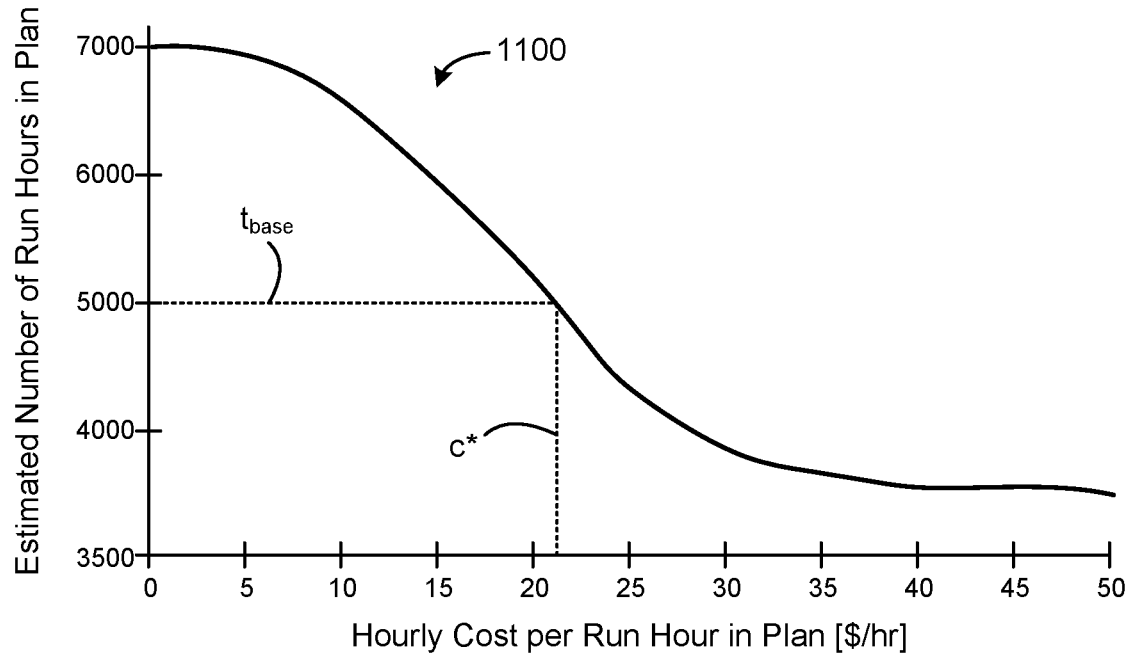
FIG. 11 is a graph of a run hour curve which can be generated by the maintenance contracts module of FIG. 9, according to an exemplary embodiment.

Run hour curve generator 1018 can be configured to generate a run hour curve using the hourly cost values $c_{hourly}$ and the resulting number of run hours determined by cost function optimizer 1020. An example of a run hour curve 1100 which can be generated by run hour curve generator 1018 is shown in FIG. 11. Run hour curve 1100 identifies the relationship between the estimated number of run hours in the plan (vertical axis) and the hourly cost per run hour (horizontal axis). In some embodiments, run hour curve generator 1018 generates run hour curve 1100 by using data points provided by hourly cost optimizer 1010 and cost function optimizer 1020. Each data point may include an hourly cost value $c_{hourly}$ (determined by hourly cost optimizer 1010) and a corresponding number of run hours (determined by cost function optimizer 1020). Run hour curve generator 1018 can interpolate between the data points to generate a continuous run hour curve 1100.

Planning Mode

Figure 12:
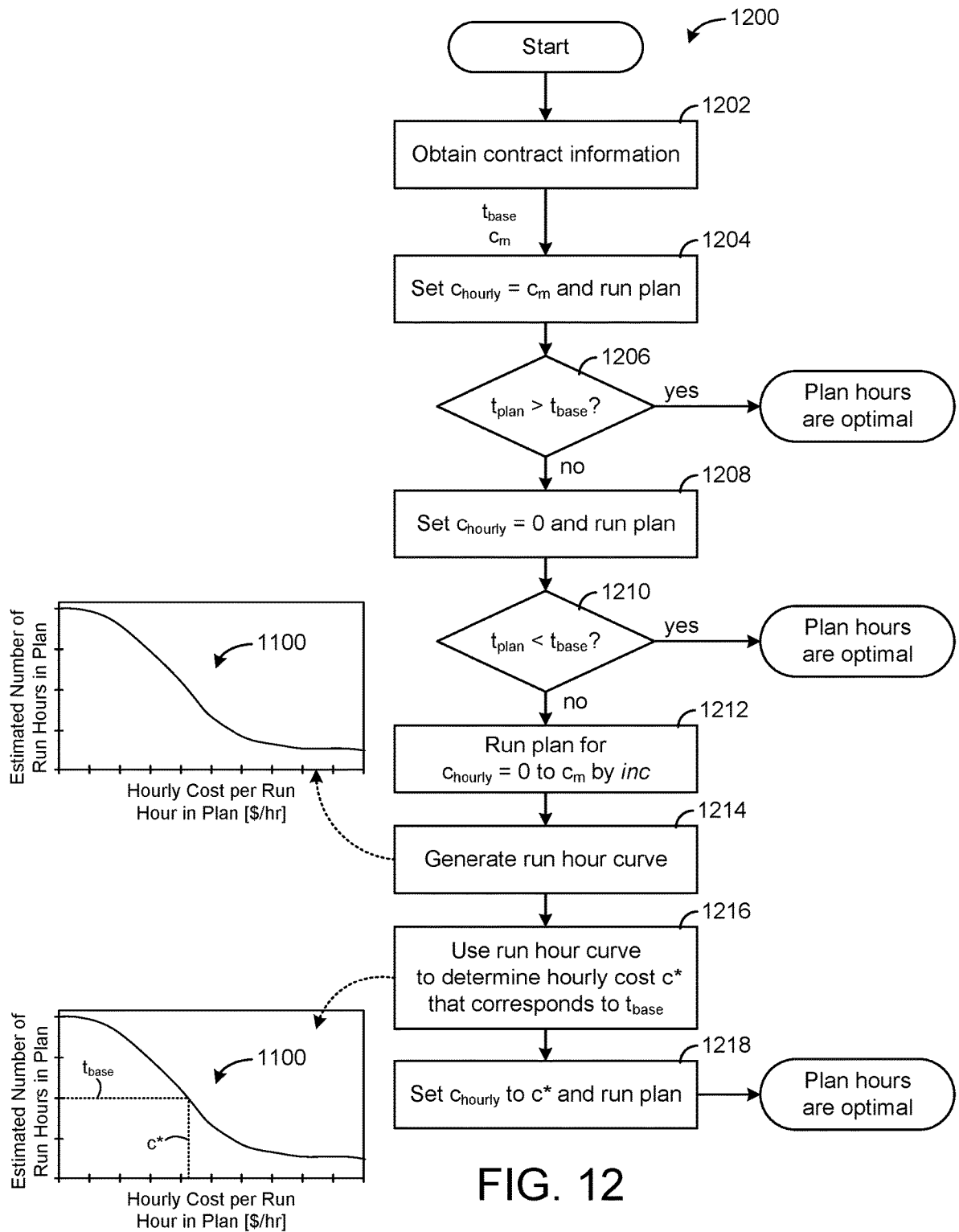
FIG. 12 is a flowchart of an offline process which can be performed by a planning mode optimizer of the maintenance contracts module, according to an exemplary embodiment.

Referring now to FIG. 12, a flowchart of a process 1200 illustrating the operations performed by planning mode optimizer 1012 is shown, according to an exemplary embodiment. Planning mode optimizer 1012 may receive contract information from a contract information database 1002 (step 1202). The contract information may include the number of base hours $t_{base}$, the marginal cost $c_m$, the base cost $C_{base}$, and/or other information specified by a maintenance contract for assets 1004.

Planning mode optimizer 1012 can set $c_{hourly}$ equal to $c_m$ and run the plan (step 1204). Running the plan may include using the value of $c_{hourly}$ to generate a maintenance cost term, modifying the cost function $J(x)$ to include the maintenance cost term, and optimizing the augmented cost function $J_a(x)$ to determine the corresponding number of run hours $t_{plan}$. Planning mode optimizer 1012 may compare the planned number of run hours $t_{plan}$ to the base number of run hours $t_{base}$ (step 1206). If the number of run hours $t_{plan}$ is greater than the base number of run hours $t_{base}$ (i.e., the result of step 1206 is "yes"), planning mode optimizer 1012 may determine that the planned run hours are optimal. However, if the number of run hours $t_{plan}$ is not greater than the base number of run hours $t_{base}$ (i.e., the result of step 1206 is "no"), planning mode optimizer 1012 may proceed to step 1208.

Planning mode optimizer 1012 can set $C_{hourly}$ equal to zero and run the plan (step 1208). As before, running the plan may include using the value of $C_{hourly}$ to generate a maintenance cost term, modifying the cost function $J(x)$ to include the maintenance cost term, and optimizing the augmented cost function $J_a(X)$ to determine the corresponding number of run hours $t_{plan}$. Planning mode optimizer 1012 may compare the planned number of run hours $t_{plan}$ to the base number of run hours $t_{base}$ (step 1210). If the number of run hours $t_{plan}$ is less than the base number of run hours $t_{base}$ (i.e., the result of step 1210 is "yes"), planning mode optimizer 1012 may determine that the planned run hours are optimal. However, if the number of run hours $t_{plan}$ is not less than the base number of run hours $t_{base}$ (i.e., the result of step 1210 is "no"), planning mode optimizer 1012 may proceed to step 1212.

Planning mode optimizer 1012 can generate multiple values of $C_{hourly}$ between $C_{hourly} = 0$ and $C_{hourly} = C_m$ (step 1212). In some embodiments, step 1212 includes adding a predetermined increment inc to each value of $C_{hourly}$ to generate the next value of $C_{hourly}$. For example, planning mode optimizer 1012 can add an increment of inc=5 to the initial value of $C_{hourly} = 0$ to generate the value $C_{hourly} = 5$. Planning mode optimizer 1012 can add the increment of inc=5 to the new value of $C_{hourly}$=5 to generate the value $C_{hourly}$=10. This process can be repeated until $C_{hourly}$=$C_m$. In some embodiments, the value of inc is a predetermined percentage of $c_m$ (e.g., 1%, 5%, 10%, etc.) such that a fixed number of values of $C_{hourly}$ are generated between $C_{hourly}$=0 and $C_{hourly}$=$C_m$.

Planning mode optimizer 1012 can run the plan using each of the values of $C_{hourly}$ generated in step 1212. As before, running the plan may include using the value of $C_{hourly}$ to generate a maintenance cost term, modifying the cost function J(x) to include the maintenance cost term, and optimizing the augmented cost function $J_a(x)$ to determine the corresponding number of run hours $t_{plan}$. By running the plan for each value of $c_{hourly}$, planning mode optimizer 1012 can generate a corresponding value of $t_{plan}$. Planning mode optimizer 1012 can use the values of $C_{hourly}$ and the corresponding values of $t_{plan}$ to generate a run hour curve (step 1214). The run hour curve may define a relationship between $t_{plan}$ and $C_{hourly}$. An example of a run hour curve which can be generated in step 1214 is shown in FIG. 11.

Planning mode optimizer 1012 can use the run hour curve to determine an hourly cost value c* that corresponds to the base number of run hours $t_{base}$ (step 1216). Step 1216 may include finding a point along the run hour curve that includes the base number of run hours $t_{base}$ and identifying the hourly cost value c* of that point. Planning mode optimizer 1012 can set $C_{hourly}$ equal to c*and run the plan (step 1218). As before, running the plan may include using the value of $C_{hourly}$ to generate a maintenance cost term, modifying the cost function J(x) to include the maintenance cost term, and optimizing the augmented cost function $J_a(x)$ to determine the corresponding number of run hours $t_{plan}$. The run hours determined in step 1218 may be the optimal run hours.

In some embodiments, planning mode optimizer 1012 may compare the number of run hours $t_{plan}$ determined in step 1218 to the base number of run hours $t_{base}$. If the difference between $t_{plan}$ and $t_{base}$ is less than a threshold value, planning mode optimizer 1012 may determine that the planned run hours determined in step 1218 are optimal. However, if the difference between $t_{plan}$ and $t_{base}$ are not less than the threshold value, planning mode optimizer 1012 may update the hourly cost value c* to obtain a number of run hours $t_{plan}$ closer to the base number of run hours $t_{base}$. For example, planning mode optimizer 1012 can regenerate a portion of the run hour curve around c* using smaller increments of the hourly cost value $C_{hourly}$. The smaller increments may result in a run hour curve with higher resolution around the hourly cost value c* to allow for more accurate interpolation. Steps 1212-1218 can be repeated until the number of run hours $t_{plan}$ determined in step 1218 is sufficiently close to the base number of run hours $t_{base}$ (e.g., within a threshold).

Planning Mode Examples

Consider, for example, a maintenance contract with $t_{base}$=3000 hours, $c_m$=50 $/hour, and an asset with the run hour curve 1100 shown in FIG. 11. In this case, the hourly cost $c_{hourly}$ will be set to 50 $/hour in step 1204. Running the plan with a value of $c_{hourly}$=50 $/hour may result in 3600 run hours in the plan (i.e., $t_{plan}$=3600). Because $t_{plan}$>$t_{base}$ (i.e. the 3600 plan hours are greater than the 3000 base hours), the plan hours are determined to be optimal in step 1206.

Consider another maintenance contract with $t_{base}$=7100 hours, $c_m$=50 $/hour, and an asset with the run hour curve 1100 shown in FIG. 11. The hourly cost $c_{hourly}$ will still be set to 50 $/hour in step 1204. Running the plan with a value of $c_{hourly}$=50 $/hour may result in 3600 run hours in the plan (i.e., $t_{plan}$=3600). Because $t_{plan}$<$t_{base}$ the 3600 plan hours are less than the 7100 base hours), the plan hours are not determined to be optimal in step 1206 and process 1200 proceeds to step 1208. In this case, the hourly cost $c_{hourly}$ will be set to 0 $/hour in step 1208. Running the plan with a value of $c_{hourly}$=0 $/hour may result in 7000 run hours in the plan (i.e., $t_{plan}$=7000). Because $t_{plan}$<$t_{base}$ the 7000 plan hours are less than the 7100 base hours), the plan hours are determined to be optimal in step 1210.

Finally, consider another maintenance contract with $t_{base}$=5000 hours, $c_m$=50 $/hour, and an asset with the run hour curve 1100 shown in FIG. 11. The tests performed in step 1206 and step 1210 will both fail. A sweep of hourly cost values $c_{hourly}$ can be performed in step 1212 to generate the entire run hour curve 1100. From run hour curve 1100, it can be seen that the base number of run hours (i.e., $t_{base}$=5000 hours) occurs at approximately 21.5 $/hour. Accordingly, the variable c* can be set to c*=21.5 $/hour in step 1218 and the plan can be run with an hourly cost value of $c_{hourly}$=c*=21.5 $/hour. For the case of the example, it will be assumed that this run yields 4953 run hours of the device. This is 47 hours away from the optimal number of hours (i.e., 5000−4953=47). If this is close enough, planning mode optimizer 1012 may end process 1200. If not, then the hourly cost $c_{hourly}$ may be decreased and step 1218 can be repeated until some number of run hours closer to 5000 is obtained.

Operational Mode

Figure 13:
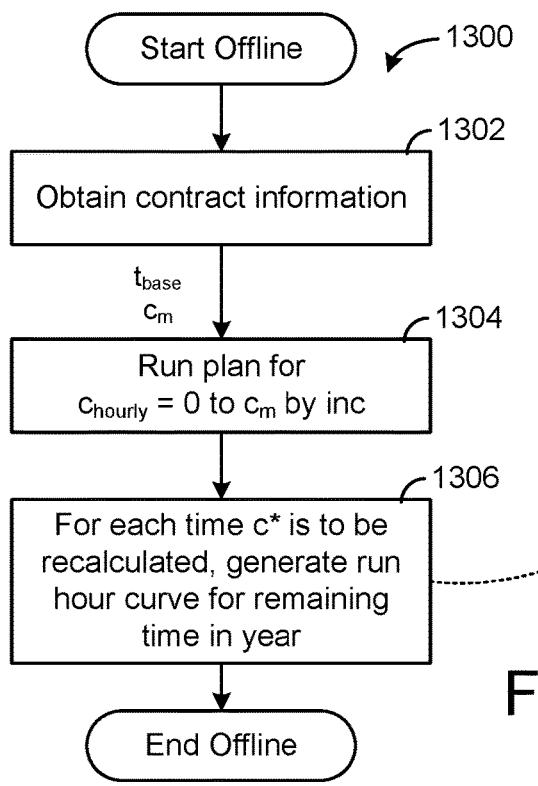
FIG. 13 is a flowchart of an offline process which can be performed by an operational mode optimizer of the maintenance contracts module, according to an exemplary embodiment.
Figure 13:
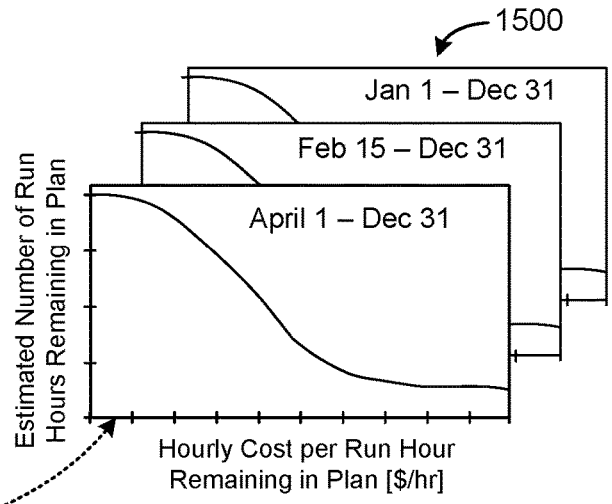
Figure 14:
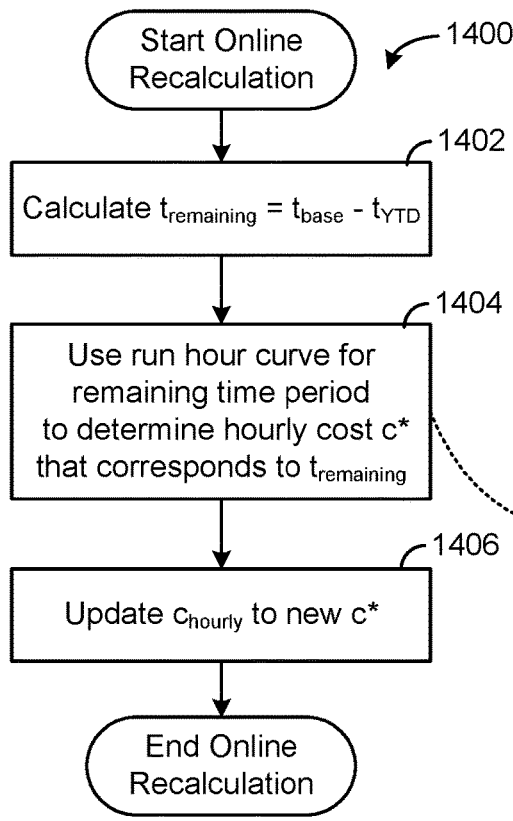
FIG. 14 is a flowchart of an online process which can be performed by the operational mode optimizer, according to an exemplary embodiment.
Figure 14:
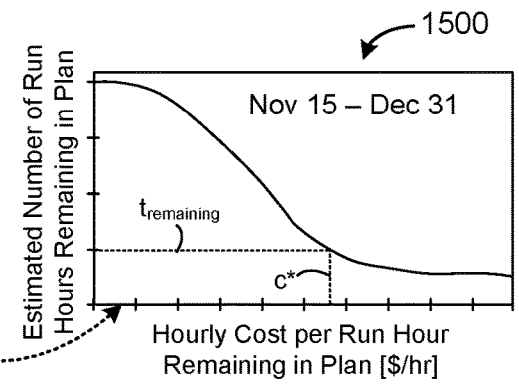

Referring now to FIGS. 13-14, flowchart of processes 1300 and 1400 illustrating the operations performed by operational mode optimizer 1014 is shown, according to an exemplary embodiment. Process 1300 can be performed by operational mode optimizer 1014 when operating in an offline mode, whereas process 1400 can be performed by operational mode optimizer 1014 when operating in an online mode. In some embodiments, the planning mode process 1200 is performed prior to either of the operational mode processes 1300-1400. Thus, a starting value for the hourly cost $c_{hourly}$ may already have been calculated by planning mode module 1012, which may be optimal to use given the data in the plan. The hourly cost value $C_{hourly}$ calculated by planning mode module 1012 can be used as a starting point for operational mode optimizer 1014.

In some embodiments, operational mode optimizer 1014 is configured to use feedback regarding the actual run hours of assets 1004 to update the hourly cost value $C_{hourly}$ at periodic intervals. This is a difference relative to planning mode optimizer 1012 which operates entirely offline. Periodically throughout the year, operational mode optimizer 1014 can recalculate the optimal value of $c_{hourly}$ for the remaining amount of time in the year. The optimization performed by operational mode optimizer 1014 may be similar to the optimization performed by planning mode optimizer 1012. However, operational mode optimizer 1014 may use the remaining number of run hours in the maintenance contract $t_{remaining}$ in place of the base number of run hours $t_{base}$ when selecting the value of c*.

In some embodiments, operational mode optimizer 1014 is configured to calculate the remaining number of run hours $t_{remaining}$ using the following equation:

$$t_{remaining}=t_{base}-t_{YTD}$$

where $t_{base}$ is the total number of run hours specified by the maintenance contract and $t_{YTD}$ is the number of run hours already used in the year-to-date. At the beginning of the year, the value of $t_{YTD}$ can be estimated at various times throughout the year based on the estimated run hours determined by planning mode optimizer 1012. During the year, feedback can be collected from assets 1004 which indicates the actual number of run hours of assets 1004. The feedback from assets 1004 can be used to determine the actual value of $t_{YTD}$ for use in updating $t_{remaining}$ periodically throughout the year.

Referring particularly to FIG. 13, a flowchart of a process 1300 performed by operational mode optimizer 1014 in the offline mode is shown, according to an exemplary embodiment. In some embodiments, process 1300 is performed once at the beginning of the year. Operational mode optimizer 1014 may receive contract information from a contract information database 1002 (step 1302). The contract information may include the number of base hours $t_{base}$, the marginal cost $c_m$, the base cost $c_{base}$, and/or other information specified by a maintenance contract for assets 1004.

Operational mode optimizer 1014 can generate multiple values of $C_{hourly}$ between $C_{hourly}=0$ and $C_{hourly}=C_m$ (step 1304). In some embodiments, step 1304 includes adding a predetermined increment inc to each value of $C_{hourly}$ to generate the next value of $C_{hourly}$. For example, operational mode optimizer 1014 can add an increment of inc=5 to the initial value of $C_{hourly}=0$ to generate the value $C_{hourly}=5$. Operational mode optimizer 1014 can add the increment of inc=5 to the new value of $C_{hourly}=5$ to generate the value $C_{hourly}=10$. This process can be repeated until $C_{hourly}=C_m$. In some embodiments, the value of inc is a predetermined percentage of $c_m$ (e.g., 1%, 5%, 10%, etc.) such that a fixed number of values of $C_{hourly}$ are generated between $C_{hourly}=0$ and $C_{hourly}=C_m$.

Figure 15:
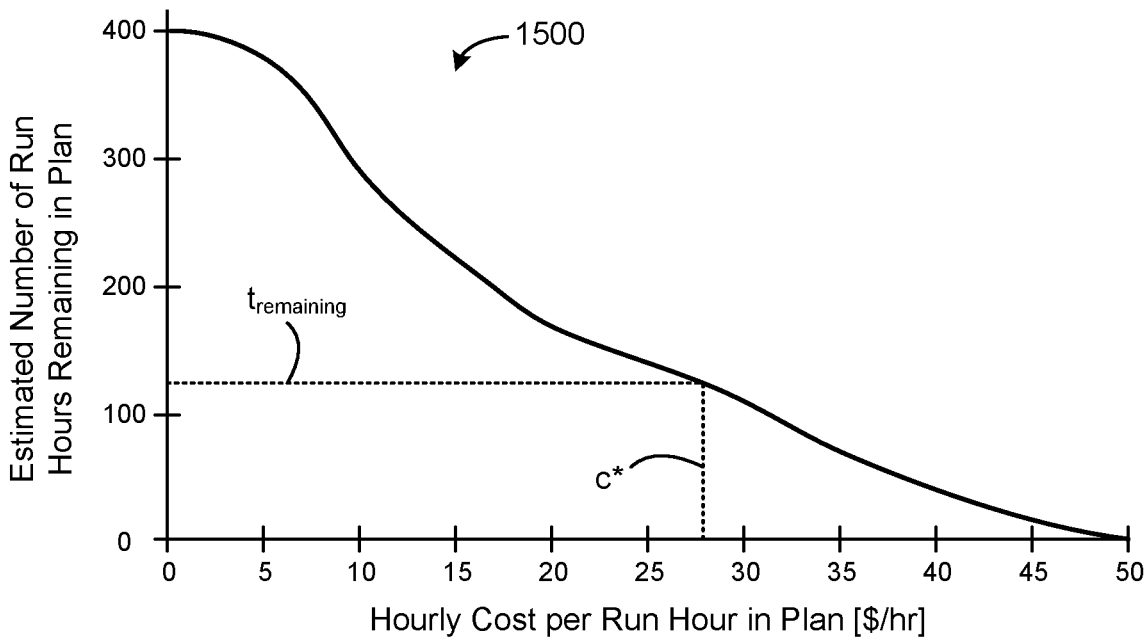
FIG. 15 is a graph of another run hour curve which can be generated by the maintenance contracts module, according to an exemplary embodiment.

Operational mode optimizer 1014 can run the plan using each of the values of $C_{hourly}$ generated in step 1304. Running the plan may include using the value of $C_{hourly}$ to generate a maintenance cost term, modifying the cost function J(x) to include the maintenance cost term, and optimizing the augmented cost function $J_a(x)$ to determine the corresponding number of run hours $t_{plan}$. By running the plan for each value of $C_{hourly}$, operational mode optimizer 1014 can generate a corresponding value of $t_{plan}$. Planning mode optimizer 1012 can use the values of $C_{hourly}$ and the corresponding values of $t_{plan}$ to generate a run hour curve (step 1306). The run hour curve may define a relationship between $t_{plan}$ and $C_{hourly}$. An example of a run hour curve which can be generated in step 1306 is shown in FIG. 15.

In step 1306, operational mode optimizer 1014 can generate a run hour curve for each time that $C_{hourly}$ is to be recalculated during the year. Each run hour curve may cover the time period beginning at the time $C_{hourly}$ will be recalculated and ending at the end of the year. For example, if $C_{hourly}$ is to be recalculated every 1.5 months, then a total of 8 run hour curves can be generated in step 1306. The first run hour curve may cover the time period from January 1-December 31, the second run hour curve may cover the time period from February 15-December 31, the third run hour curve may cover the time period from April 1-December 31, and so on.

Rather than repeating process 1300 periodically throughout the year, all the run hour curves generated in step 1306 can be created at the beginning of the year and saved to perform the periodic recalculations of $c_{hourly}$. The run hour curves generated in step 1306 (denoted t(c, k) as these curves are now a function of iteration) can be used to perform the periodic recalculation of $C_{hourly}$ with no additional planning simulations at the end of each period. In fact, it doesn't require any additional planning simulations in general, as all the run hour curves can be generated for a fixed hourly cost from a single simulation.

Referring particularly to FIG. 13, a flowchart of a process 1400 performed by operational mode optimizer 1014 in the online mode is shown, according to an exemplary embodiment. In some embodiments, process 1400 is repeated periodically throughout the year to update $c_{hourly}$. For example, process 1400 can be performed at the beginning of each of the time periods corresponding to the run hour curves generated by process 1300 (e.g., February 15, April 1, May 15, etc.).

At the beginning of each time period, operational mode optimizer 1014 may calculate $t_{remaining}$ (step 1402). $t_{remaining}$ can be calculated by subtracting the actual number of run hours $t_{YTD}$ of assets 1004 that have been used in the year-to-date from the base number of run hours $t_{base}$ specified by the maintenance contract (i.e., $t_{remaining}=t_{base}-t_{YTD}$). For example, if step 1402 is performed at April 1, $t_{YTD}$ may be the number of run hours used in the time period from January 1-March 31. Feedback from assets 1004 or from a building management system that monitors and controls assets 1004 can be used to determine the actual number of run hours $t_{YTD}$ used in the year-to-date.

Operational mode optimizer 1014 can use the run hour curve for the remaining time period to determine an hourly cost value c* that corresponds to the calculated number of run hours $t_{remaining}$ remaining (step 1404). Step 1404 may include finding a point along the run hour curve that includes the remaining number of run hours $t_{remaining}$ and identifying the hourly cost value c* of that point. Operational mode optimizer 1014 can update $C_{hourly}$ to be equal to the value of c* (step 1406). The updated value of $C_{hourly}$ can then be used to run the plan to determine the optimal run hours. As before, running the plan may include using the value of $C_{hourly}$ to generate a maintenance cost term, modifying the cost function J(x) to include the maintenance cost term, and optimizing the augmented cost function $J_a(x)$ to determine the optimal hours at which to run assets 1004.

Continuous Update

Referring now to FIGS. 16-19, several graphs 1600-1900 illustrating the operations performed by continuous updater 1016 are shown, according to an exemplary embodiment. Continuous updater 1016 can be configured to continuously update the value of $C_{hourly}$ with each iteration (i.e., after each time step) of the high level optimization process. In some embodiments, continuous updater 1016 updates the value of $C_{hourly}$ by performing processes 1300-1400 after every iteration of the optimization. For example, continuous updater 1016 can generate a run hour curve that corresponds to each time step in the optimization period (e.g., each hour) in process 1300 and may recalculate $C_{hourly}$ by performing process 1400 after each time step.

In some embodiments, continuous updater 1016 updates the value of $c_{hourly}$ from time step k to time step k+1 using the derivative of the run hour curve t(c, k) with respect to hourly cost $$\left(\text{i.e., } \frac{\partial t}{\partial c}\right).$$

The notation t(c, k) is used to denote the run hour curve for the time period that begins at time step k and ends at the end of the year (i.e., the run hour curve for time step k). As described above, each run hour curve t(c, k) may express the estimated number of run hours t as a function of the hourly cost c. Accordingly the derivative $$\frac{\partial t}{\partial c}$$

may be equivalent the slope or gradient of the run hour curve t(c, k) with respect to hourly cost $c_{hourly}$.

Continuous updater 1016 can calculate the hourly cost $c_{k+1}^*$ at time step k+1 as an iterative function of the hourly cost $c_k^*$ at time step k. In some embodiments, continuous updater 1016 calculates $c_{k+1}^*$ using the following equation:

$$c_{k+1}^* = c_k^* + \Delta t \left\{ \frac{\partial t}{\partial c} \right\}_{k,c^*}^{-1}$$

where $c_k^*$ is the hourly cost at time step k, $$\left\{ \frac{\partial t}{\partial c} \right\}_{k,c^*}$$

is the derivative of me run hour curve t(c, k) for time step k at the location of the hourly cost $c_k^*$, and $\Delta t$ is the difference between the planned number of run hours during time step k and the actual number of run hours during time step k (i.e., $\Delta t$=planned run hours−actual run hours). For example, if assets 1004 were planned to use five run hours during time step k but did not actually run during time step k (i.e., used zero run hours), the value of $\Delta t$ would be $\Delta t$=5. Similarly, if assets were planned to remain off during time step k (i.e., planned to use zero run hours) but actually ran during time step k using five run hours, the value of $\Delta t$ would be $\Delta t$=−5.

Continuous Update Examples

Figure 16:
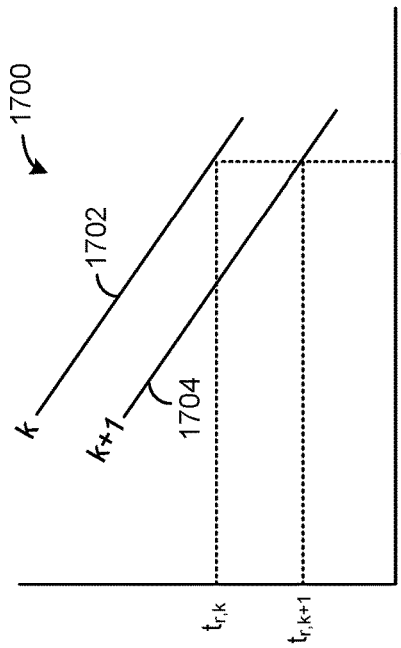
FIG. 16 is a graph illustrating a technique for continuously updating an hourly cost used by the maintenance contracts module when a device is expected to run but actually does not run during a time step of an optimization period, according to an exemplary embodiment.

Referring particularly to FIG. 16, consider an optimization system running online at hour k into the year. Assume that the planning simulation at hour k showed it was optimal to run a given device during hour k. In other words, the planned number of run hours for the device during hour k is equal to 1. Moving from the beginning of hour k to the beginning of hour k+1, the remaining number of run hours $t_{remaining}$ is planned to decrease by 1 run hour because 1 run hour would be used during hour k. Accordingly, the run hour curve 1604 for hour k+1 is shifted downward in graph 1600 relative to the run hour curve 1602 for hour k by 1 run hour because the estimated number of run hours remaining in the plan $t_{remaining}$ is planned to decrease by 1 run hour.

If the device does not actually run during hour k, the remaining number of remaining run hours $t_{remaining}$ built into the contract does not change. Thus, the actual number of run hours remaining at hour k (i.e., $t_{r,k}$) will be equal to the actual number of run hours remaining at hour k+1 (i.e., $t_{r,k+1}$), as shown in graph 1600. Continuous updater 1016 can use the run hour curve 1604 for hour k+1 and the value of $t_{r,k+1}$ to identify the corresponding value of the hourly cost $c_{k+1}^*$ at hour k+1. As shown in graph 1600, the value of $c_{k+1}^*$ will be less than the value of $c_k^*$. The amount of the decrease in the hourly cost value is equal to the inverse of the slope of the run hour curve 1602 multiplied by the duration of the time step between hour k and hour k+1 (because run hour curves 1602 and 1604 are separated by the run time difference between hour k and hour k+1).

For the scenario shown in graph 1600, the difference between the planned run time during hour k (i.e., 1 hour) and the actual run time during hour k (i.e., 0 hours) is equal to 1 run hour. In other words, $\Delta t$=1 hour. Accordingly, continuous updater 1016 can update the hourly cost value using the equation:

$$c_{k+1}^* = c_k^* + \Delta t \left\{ \frac{\partial t}{\partial c} \right\}_{k,c^*}^{-1}$$

where the sign of the derivative $$\frac{\partial t}{\partial c}$$

is negative such that the addition sign in this equation results in a decrease to the hourly cost value $c_k^*$.

Figure 17:
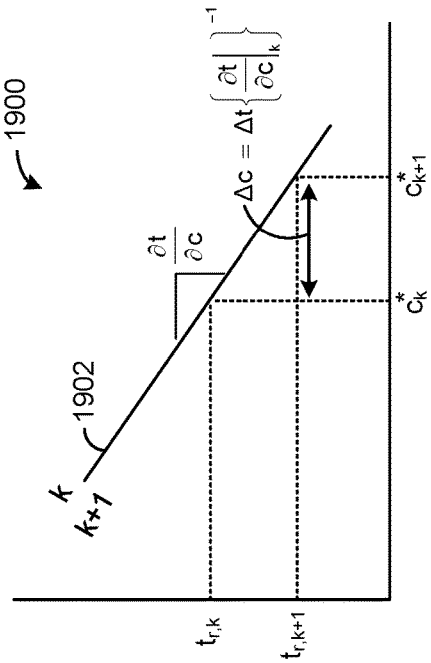
FIG. 17 is a graph illustrating a technique for continuously updating the hourly cost when a device is expected to run and actually does run during a time step of the optimization period, according to an exemplary embodiment.

Referring now to FIG. 17, consider another optimization system running online at hour k into the year. Assume that the planning simulation at hour k showed it was optimal to run a given device during hour k. In other words, the planned number of run hours for the device during hour k is equal to 1. Moving from the beginning of hour k to the beginning of hour k+1, the remaining number of run hours $t_{remaining}$ is planned to decrease by 1 run hour because 1 run hour would be used during hour k. Accordingly, the run hour curve 1704 for hour k+1 is shifted downward in graph 1700 relative to the run hour curve 1702 for hour k by 1 run hour because the estimated number of run hours remaining in the plan $t_{remaining}$ is planned to decrease by 1 run hour.

If the device actually runs during hour k, then the remaining number of run hours $t_{remaining}$ decreases by the same amount as the planned decrease. In other words the difference between $t_{r,k+1}$ and $t_{r,k}$ is equivalent to the vertical shift from run hour curve 1702 to run hour curve 1704. Continuous updater 1016 can use the run hour curve 1704 for hour k+1 and the value of $t_{r,k+1}$ to identify the corresponding value of the hourly cost $c_{k+1}^*$ at hour k+1. As shown in graph 1600, the value of $c_{k+1}^*$ will be equal to the value of $c_k^*$ because both the run hour curve and remaining number of run hours decrease by the same amount.

For the scenario shown in graph 1700, the difference between the planned run time during hour k (i.e., 1 hour) and the actual run time during hour k (i.e., 1 hour) is equal to 0 run hours. In other words, $\Delta t$=0 hours. Accordingly, the equation:

$$c_{k+1}^* = c_k^* + \Delta t \left\{ \frac{\partial t}{\partial c} \right\}_{k,c^*}^{-1}$$

will result in an updated hourly cost value of $c_{k+1}^*=c_k^*$ because $\Delta t$=0.

Figure 18:
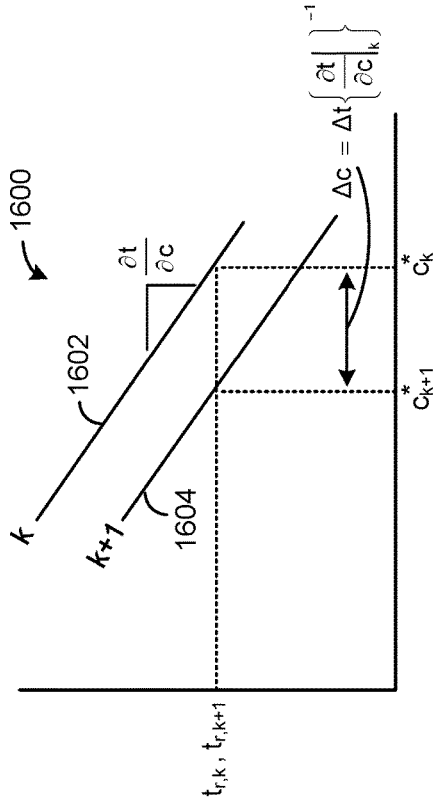
FIG. 18 is a graph illustrating a technique for continuously updating the hourly cost when a device is expected to not run and actually does not run during a time step of the optimization period, according to an exemplary embodiment.

Referring now to FIG. 18, consider another optimization system running online at hour k into the year. Assume that the planning simulation at hour k showed it was not optimal to run a given device during hour k. In other words, the planned number of run hours for the device during hour k is equal to 0. Moving from the beginning of hour k to the beginning of hour k+1, the remaining number of run hours $t_{remaining}$ is planned to remain the same because 0 run hours would be used during hour k. Accordingly, the run hour curve 1802 is not shifted in graph 1800 and represents both the run hour curve for time step k+1 and the run hour curve for run hour k.

If the device does not actually run during hour k, the remaining number of remaining run hours $t_{remaining}$ built into the contract does not change. Thus, the actual number of run hours remaining at hour k (i.e., $t_{r,k}$) will be equal to the actual number of run hours remaining at hour k+1 (i.e., $t_{r,k+1}$), as shown in graph 1800. Continuous updater 1016 can use the run hour curve 1802 and the value of $t_{r,k+1}$ to identify the corresponding value of the hourly cost $c_{k+1}^*$ at hour k+1. As shown in graph 1800, the value of $c_{k+1}^*$ will be equal to the value of $c_k^*$.

For the scenario shown in graph 1800, the difference between the planned run time during hour k (i.e., 0 hours) and the actual run time during hour k (i.e., 0 hours) is equal to 0 run hours. In other words, $\Delta t=0$ hours. Accordingly, the equation:

$$c_{k+1}^* = c_k^* + \Delta t \left\{ \frac{\partial t}{\partial c} \right\}_{k,c^*}^{-1}$$

will result in an updated hourly cost value of $c_{k+1}^* = c_k^*$ because $\Delta t=0$.

Figure 19:
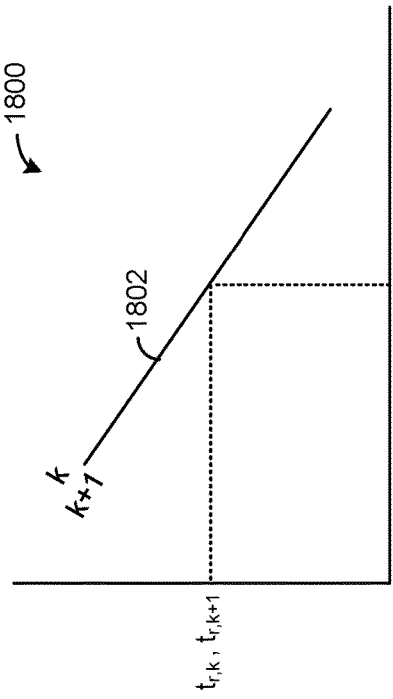
FIG. 19 is a graph illustrating a technique for continuously updating the hourly cost when a device is expected to not run but actually does run during a time step of the optimization period, according to an exemplary embodiment.

Referring now to FIG. 19, consider another optimization system running online at hour k into the year. Assume that the planning simulation at hour k showed it was not optimal to run a given device during hour k. In other words, the planned number of run hours for the device during hour k is equal to 0. Moving from the beginning of hour k to the beginning of hour k+1, the remaining number of run hours $t_{remaining}$ is planned to remain the same because 0 run hours would be used during hour k. Accordingly, the run hour curve 1902 is not shifted in graph 1900 and represents both the run hour curve for time step k+1 and the run hour curve for run hour k.

If the device actually runs during hour k, then the remaining number of run hours $t_{remaining}$ decreases by 1 run hour. In other words the difference between $t_{r,k+1}$ and $t_{r,k}$ is equal to 1 run hour. Continuous updater 1016 can use the run hour curve 1902 to identify the corresponding value of the hourly cost $c_{k+1}^*$ at hour k+1. As shown in graph 1900, the value of $c_{k+1}^*$ will be greater than the value of $c_k^*$ because run hour curve 1902 has a negative slope.

For the scenario shown in graph 1900, the difference between the planned run time during hour k (i.e., 0 hours) and the actual run time during hour k (i.e., 1 hour) is equal to $-1$ run hour. In other words, $\Delta t=-1$ hour. Accordingly, continuous updater 1016 can update the hourly cost value using the equation:

$$c_{k+1}^* = c_k^* + \Delta t \left\{ \frac{\partial t}{\partial c} \right\}_{k,c^*}^{-1}$$

where both the derivative $$\frac{\partial t}{\partial c}$$

and $\Delta t$ are negative such that the addition sign in this equation results in an increase to the hourly cost value $c_k^*$.

Advantageously, continuous updater 1016 can use the iterative updating technique described herein to update the value of $c_{hourly}$ after each time iteration. All that is required is the derivative $$\frac{\partial t}{\partial c}$$

of the function of the remaining hours in the plan as a function of the current hourly cost $c_k^*$ at the current iteration as well as a planning simulation that shows the planned on/off state of the device for every iteration of the year and for every cost.

On/Off State Estimation

Figure 20:
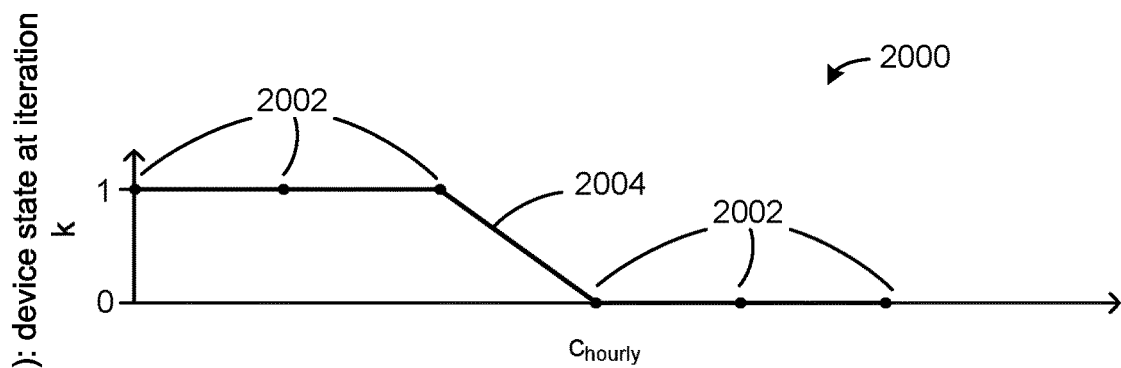
FIG. 20 is a graph illustrating a technique for estimating the on/off state of devices, according to an exemplary embodiment.

Referring now to FIG. 20, a graph 2000 illustrating a technique for estimating the on/off state of assets 1004 is shown, according to an exemplary embodiment. Continuous updater 1016 can be configured to estimate the on/off state of assets 1004 in order to determine whether the actual run hours of assets 1004 is equal to the planned run hours of assets 1004 at each time step. It can be difficult to accurately determine the on/off state at every cost, as the binary function that indicates on/off states may be discontinuous. For example, assets 1004 may have binary on/off states (i.e., either on or off), represented by points 2002 having a value of either 0 or 1.

Continuous updater 1016 can approximate the discontinuous function shown in graph 2000 with a value linearly interpolated between the hourly costs that define the interval where the device transitioned from running to not running for that specific iteration. For example, let the binary on/off function be denoted b(c, k). In this approximation, the function b is allowed to take on intermediate values between 0 and 1. For example, b(c, k) could take on the form shown by line 2004. It is possible to approximate b to arbitrary precision by running the planning simulations for more hourly costs.

Figure 21A:
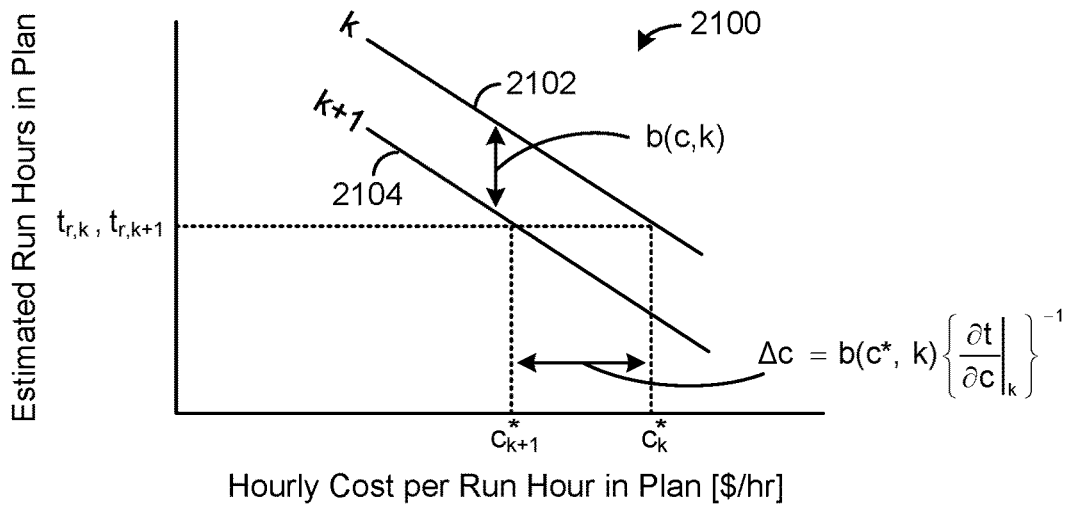
FIGS. 21A-21B are graphs illustrating a technique for continuously updating the hourly cost using a difference between a planned change in remaining run hours and an actual change in the remaining run hours, according to an exemplary embodiment.
Figure 21B:
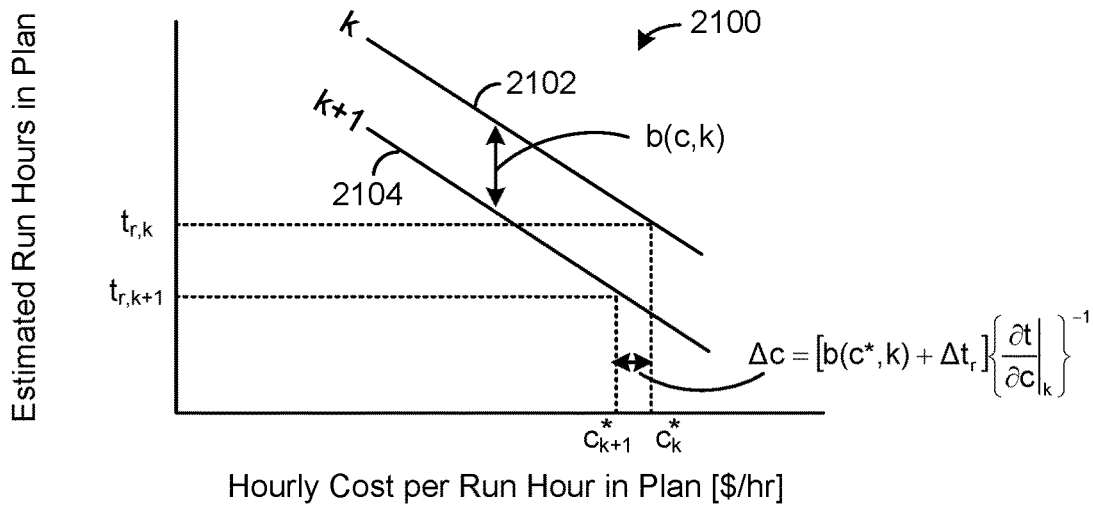

Referring now to FIGS. 21A-21B, continuous updater 1016 can use the linear approximation shown in graph 2000 to determine that the run hour curve 2104 at hour k+1 changes by an amount b(c, k) relative to the run hour curve at hour k (as shown in graph 2100). The variable b(c*, k) represents the planned change in the remaining runtime between hours k and k+1. The actual number of remaining run hours may change by $\Delta t_r$ based on whether the device actually runs during hour k. FIG. 21A illustrates the scenario in which the device does not run and therefore $\Delta t_r=0$ (i.e., $t_{r,k+1}=t_{r,k}$). FIG. 21B illustrates the scenario in which the device does run and therefore $\Delta t_r=t_{r,k+1}-t_{r,k}$.

Continuous updater 1016 can update the hourly cost $C_{hourly}$ using the following equation:

$$c_{k+1}^* = c_k^* + \{b(c^*, k) + \Delta t_r\} \left\{ \frac{\partial t}{\partial c} \right\}_{k,c^*}^{-1}$$

or $$c_{k+1}^* = c_k^* + \Delta t \left\{ \frac{\partial t}{\partial c} \right\}_{k,c^*}^{-1}$$

where $\Delta t$ is still equal to the difference between the planned run time (possibly a fraction due to approximation) and the actual run time, b(c*, k) is equal to the planned change in the run time, and $\Delta t_r$ is equal to the actual change in the run time (e.g., $\Delta t_r=t_{r,k+1}-t_{r,k}$). In some embodiments, continuous updater 1016 finds the derivative $$\frac{\partial t}{\partial c}$$

by sampling the run hour curve 2102, representing the run hour curve 2102 as a linear surface (e.g., each piece represented by a triangle) and using this to evaluate the derivative $$\frac{\partial t}{\partial c}$$

at the point $c_k^*$.

In some embodiments, continuous updater 1016 updates the hourly cost $c_{hourly}$ by performing both offline/planning steps and online/operational steps. The offline/planning steps may include running the plan for several hourly costs and using plan data to determine a piecewise linear version of $$\frac{dt(c, k)}{dc}$$

and b(c, k) for the device under contract. The online/operational steps may include calculating the difference Δt between the planned run time and the operational run time for the device under contract and using the derivative $$\frac{dt(c, k)}{dc}$$

to update the current hourly cost $c_k^*$ using the equation $$c_{k+1}^* = c_k^* + \Delta t \left\{ \frac{\partial t}{\partial c} \right\}_{k, c^*}^{-1}.$$

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for cost optimal operation of an energy facility including equipment covered by a maintenance contract, the control system comprising:
   equipment configured to operate during an optimization period; and
   a controller configured to:
   obtain a cost function that defines a cost of operating the energy facility over the optimization period as a function of one or more setpoints for the equipment;
   modify the cost function to include a maintenance cost term that defines a maintenance cost as a function of a rate variable and an equipment usage variable;
   simulate the cost of operating the energy facility over the optimization period at each of a plurality of different values of the rate variable, the plurality of different values of the rate variable defining a plurality of different maintenance costs per unit of the equipment usage variable;
   select a value of the rate variable that results in a lowest cost of operating the energy facility over the optimization period;
   perform an online optimization of the cost function with the rate variable set to the selected value to generate the one or more setpoints for the equipment; and
   operate the equipment during the optimization period in accordance with the one or more setpoints generated by performing the online optimization.

2. The control system of claim 1, wherein:
   the equipment usage variable quantifies a total number of run hours during which the equipment are operated over the optimization period; and
   the rate variable defines an hourly cost of maintenance per run hour of the equipment.

3. The control system of claim 1, wherein:
the equipment usage variable quantifies a total production of the equipment over the optimization period; and
the rate variable defines a cost of maintenance per unit of production of the equipment.

4. The control system of claim 1, wherein the maintenance contract defines the maintenance cost as a piecewise-defined function of the equipment usage variable wherein:
the maintenance cost is equal to a base cost if the equipment are operated such that the equipment usage variable is less than a base value; and
the maintenance cost is equal to the base cost plus a penalty cost if the equipment are operated such that the equipment usage variable is greater than or equal to the base value, the penalty cost comprising a product of a marginal cost and an amount by which the equipment usage variable exceeds the base value.

5. The control system of claim 1, wherein the controller is configured to:
determine, for each of the plurality of different values of the rate variable, a corresponding value of the equipment usage variable that results from simulating the cost of operating the energy facility over the optimization period at the corresponding value of the rate variable;
identify the value of the rate variable that results in the corresponding equipment usage variable having a value substantially equal to a base value of the equipment usage variable defined by the maintenance contract; and
select the identified value of the rate variable as the value of the rate variable that results in the lowest cost of operating the energy facility over the optimization period.

6. The control system of claim 1, wherein the controller is configured to:
simulate the cost of operating the energy facility over the optimization period with the rate variable set to zero to determine a corresponding value of the equipment usage variable;
determine whether the corresponding value of the equipment usage variable is less than a base value of the equipment usage variable defined by the maintenance contract; and
perform the online optimization with the rate variable set to zero in response to a determination that the corresponding value of the equipment usage variable is less than the base value of the equipment usage variable defined by the maintenance contract.

7. The control system of claim 1, wherein the controller is configured to:
simulate the cost of operating the energy facility over the optimization period with the rate variable set to a marginal cost defined by the maintenance contract to determine a corresponding value of the equipment usage variable;
determine whether the corresponding value of the equipment usage variable is greater than a base value of the equipment usage variable defined by the maintenance contract; and
perform the online optimization with the rate variable set to the marginal cost in response to a determination that the corresponding value of the equipment usage variable is greater than the base value of the equipment usage variable defined by the maintenance contract.

8. The control system of claim 1, wherein the controller is configured to simulate the cost of operating the energy facility over the optimization period at each of the plurality of different values of the rate variable by:
setting the rate variable to each of the plurality of different values; and
performing a plurality of offline optimizations of the cost function, each offline optimization using a different version of the cost function in which the rate variable is set to one of the plurality of different values.

9. The control system of claim 1, wherein the controller is configured to:
identify an expected operation of the equipment during a time step of the optimization period based on the one or more setpoints generated by the online optimization;
compare the expected operation of the equipment during the time step with an actual operation of the equipment during the time step; and
update the value of the rate variable in response to the actual operation of the equipment during the time step differing from the expected operation of the equipment during the time step.

10. The control system of claim 1, wherein the controller is configured to update the value of the rate variable at a time during the optimization period by:
identifying a base value of the equipment usage variable defined by the maintenance contract;
calculating a difference between the base value of the equipment usage variable and an amount of the equipment usage variable used between a beginning of the optimization period and the time during the optimization period;
determining, for each of the plurality of different values of the rate variable, a corresponding value of the equipment usage variable that results from simulating the cost of operating the energy facility over an amount of time remaining in the optimization period at the corresponding value of the rate variable; and
selecting the value of the rate variable that results in the corresponding value of the equipment usage variable having a value substantially equal to the difference between the base value of the equipment usage variable and the amount of the equipment usage variable used between the beginning of the optimization period and the time during the optimization period.

11. A method for cost optimal operation of an energy facility including equipment covered by a maintenance contract, the method comprising:
obtaining a cost function that defines a cost of operating the energy facility over an optimization period as a function of one or more setpoints for the equipment;
modifying the cost function to include a maintenance cost term that defines a maintenance cost as a function of variable rate variable and an equipment usage variable;
simulating the cost of operating the energy facility over the optimization period at each of a plurality of different values of the rate variable, at least two of the different values of the rate variable defining different maintenance costs per unit of the equipment usage variable;
selecting a value of the rate variable that results in a lowest cost of operating the energy facility over the optimization period;
performing an online optimization of the cost function with the rate variable set to the selected value to generate the one or more setpoints for the equipment; and operating the equipment during the optimization period in accordance with the one or more setpoints generated by performing the online optimization.

12. The method of claim 11, wherein:
the equipment usage variable quantifies a total number of run hours during which the equipment are operated over the optimization period; and
the rate variable defines an hourly cost of maintenance per run hour of the equipment.

13. The method of claim 11, wherein:
the equipment usage variable quantifies a total production of the equipment over the optimization period; and
the rate variable defines a cost of maintenance per unit of production of the equipment.

14. The method of claim 11, wherein the maintenance contract defines the maintenance cost as a piecewise-defined function of the equipment usage variable wherein:
the maintenance cost is equal to a base cost if the equipment are operated such that the equipment usage variable is less than a base value; and
the maintenance cost is equal to the base cost plus a penalty cost if the equipment are operated such that the equipment usage variable is greater than or equal to the base value, the penalty cost comprising a product of a marginal cost and an amount by which the equipment usage variable exceeds the base value.

15. The method of claim 11, comprising:
determining, for each of the plurality of different values of the rate variable, a corresponding value of the equipment usage variable that results from simulating the cost of operating the energy facility over the optimization period at the corresponding value of the rate variable;
identifying the value of the rate variable that results in the corresponding equipment usage variable having a value substantially equal to a base value of the equipment usage variable defined by the maintenance contract; and
selecting the identified value of the rate variable as the value of the rate variable that results in the lowest cost of operating the energy facility over the optimization period.

16. The method of claim 11, comprising:
simulating the cost of operating the energy facility over the optimization period with the rate variable set to zero to determine a corresponding value of the equipment usage variable;
determining whether the corresponding value of the equipment usage variable is less than a base value of the equipment usage variable defined by the maintenance contract; and
performing the online optimization with the rate variable set to zero in response to a determination that the corresponding value of the equipment usage variable is less than the base value of the equipment usage variable defined by the maintenance contract.

17. The method of claim 11, comprising:
simulating the cost of operating the energy facility over the optimization period with the rate variable set to a marginal cost defined by the maintenance contract to determine a corresponding value of the equipment usage variable;
determining whether the corresponding value of the equipment usage variable is greater than a base value of the equipment usage variable defined by the maintenance contract; and
performing the online optimization with the rate variable set to the marginal cost in response to a determination that the corresponding value of the equipment usage variable is greater than the base value of the equipment usage variable defined by the maintenance contract.

18. The method of claim 11, wherein simulating the cost of operating the energy facility over the optimization period at each of the plurality of different values of the rate variable comprises:
setting the rate variable to each of the plurality of different values; and
performing a plurality of offline optimizations of the cost function, each offline optimization using a different version of the cost function in which the rate variable is set to one of the plurality of different values.

19. The method of claim 11, comprising:
identifying an expected operation of the equipment during a time step of the optimization period based on the one or more setpoints generated by the online optimization;
comparing the expected operation of the equipment during the time step with an actual operation of the equipment during the time step; and
updating the value of the rate variable in response to the actual operation of the equipment during the time step differing from the expected operation of the equipment during the time step.

20. The method of claim 11, comprising updating the value of the rate variable at a time during the optimization period by:
identifying a base value of the equipment usage variable defined by the maintenance contract;
calculating a difference between the base value of the equipment usage variable and an amount of the equipment usage variable used between a beginning of the optimization period and the time during the optimization period;
determining, for each of a plurality of different values of the rate variable, a corresponding value of the equipment usage variable that results from simulating the cost of operating the energy facility over an amount of time remaining in the optimization period at the corresponding value of the rate variable; and
selecting the value of the rate variable that results in the corresponding value of the equipment usage variable having a value substantially equal to the difference between the base value of the equipment usage variable and the amount of the equipment usage variable used between the beginning of the optimization period and the time during the optimization period.

* * * * *